(12) United States Patent
Kumar

(10) Patent No.: US 11,083,960 B2
(45) Date of Patent: *Aug. 10, 2021

(54) CRYPTOGRAPHICALLY BASED SYSTEM AND PROTOCOL FOR PROVABLY FAIR TOKEN-BASED GAMES

(71) Applicant: Srijan Kumar, Doranda (IN)

(72) Inventor: Srijan Kumar, Doranda (IN)

( * ) Notice: Subject to any disclaimer, the term of this patent is extended or adjusted under 35 U.S.C. 154(b) by 142 days.

This patent is subject to a terminal disclaimer.

(21) Appl. No.: 16/246,836

(22) Filed: Jan. 14, 2019

(65) Prior Publication Data

US 2019/0143206 A1    May 16, 2019

Related U.S. Application Data

(63) Continuation-in-part of application No. PCT/IB2017/054276, filed on Jul. 14, 2017.

(30) Foreign Application Priority Data

Jul. 14, 2016    (IN) .............................. 201631024077

(51) Int. Cl.
| | |
|---|---|
| *A63F 9/24* | (2006.01) |
| *A63F 13/30* | (2014.01) |
| *A63F 13/75* | (2014.01) |
| *A63F 13/352* | (2014.01) |
| *A63F 13/71* | (2014.01) |

(Continued)

(52) U.S. Cl.
CPC ............ *A63F 13/30* (2014.09); *A63F 13/352* (2014.09); *A63F 13/71* (2014.09); *A63F 13/75* (2014.09); *G06F 21/602* (2013.01); *G07F 17/3225* (2013.01); *G07F 17/3241* (2013.01); *H04L 9/0637* (2013.01); *H04L 9/30* (2013.01); *H04L 9/3213* (2013.01); *H04L 9/3242* (2013.01); *H04L 2209/38* (2013.01)

(58) Field of Classification Search
CPC ........ A63F 13/30; A63F 13/75; A63F 13/352; A63F 13/71; G07F 17/3225; G07F 17/3241; H04L 9/0637; H04L 9/30; H04L 2209/38; G06F 21/602
See application file for complete search history.

(56) References Cited

U.S. PATENT DOCUMENTS

| | | | |
|---|---|---|---|
| 6,949,022 B1 * | 9/2005 | Showers .............. | G07F 17/3241 463/16 |
| 2015/0258450 A1 * | 9/2015 | Irwin, Jr. ................ | A63F 13/77 463/22 |
| 2020/0201683 A1 * | 6/2020 | Muskal ................. | H04L 9/0891 |

OTHER PUBLICATIONS

Declaration of Non-Establishment of International Search Report for PCT/IB2017/054276; International Filing Date: Jul. 14, 2017.

(Continued)

*Primary Examiner* — Dmitry Suhol
*Assistant Examiner* — Carl V Larsen
(74) *Attorney, Agent, or Firm* — Karthik Murthy; Murthy Patent Law PLLC

(57) ABSTRACT

Exemplary embodiments of the present disclosure are directed towards a client server-based system for online token-based games. The system comprises a plurality of game client computing devices configured to play an online token-based game, and a game-based server system comprising central game server configured to connect the players and a protocol manager to provide a plurality of protocols for providing a token based game in a collusion resistant, verifiable and provably fair manner over a network.

20 Claims, 15 Drawing Sheets

(51) Int. Cl.
*G06F 21/60* (2013.01)
*G07F 17/32* (2006.01)
*H04L 9/06* (2006.01)
*H04L 9/30* (2006.01)
*H04L 9/32* (2006.01)

(56) References Cited

OTHER PUBLICATIONS

Written Opinion for PCT/IB2017/054276; International Filing Date: Jul. 14, 2017.

* cited by examiner

CRYPTOGRAPHICALLY BASED SYSTEM AND PROTOCOL FOR PROVABLY FAIR TOKEN-BASED GAMES

CROSS-REFERENCE TO RELATED APPLICATIONS

The present application is a continuation-in-part of PCT Application No. PCT/IB2017/054276, which was filed on Jul. 14, 2017, and which claims priority to Indian Application No. 201631024177, filed on Jul. 14, 2016, the entire contents both of which are hereby incorporated by reference.

FIELD OF TECHNOLOGY

The following relates to the field of online gaming systems. More particularly, the following relates to a multi-player gaming system.

BACKGROUND

In the existing token-based games of chance and skill such as Rummy, Poker. Dominoes and the like, the random distribution of game tokens, such as the random distribution of playing cards has been known for many centuries. Prior to the introduction of digital computer games, the most common method of randomly distributing game tokens comprised physically shuffling the tokens prior to the distribution of those tokens. Typically, when people host and play these games using digital computers connected on a network, the game tokens are shuffled and distributed by a central host known as the server. The server may use random numbers generated from software known as a Random Number Generator (RNG) to do this. This creates trust issues for the players since they cannot be sure whether the random token shuffling and distribution process has not been intentionally skewed to favor one player or another. Another problem is that of privacy of secret tokens such as hole cards in Poker. Players cannot be sure that their cards are not known to their opponents as the server does the dealing and may leak this information. Yet another problem is that of collusion. Not only are collusions harder to find on a network, but also colluding parties can share information with greater ease.

In light of the discussion, there exists a need for a client-server based system and a method for playing token-based games with collusion resistance, verifiability and provable fairness over a network.

SUMMARY

An aspect relates to a client-server-based system for playing online token-based games in a collusion resistant, verifiable and provably fair manner is presented. The client-server based system comprises a plurality of client computing devices (hereinafter also referred to as client terminals) configured with client software to enable players to access, join and play an online card game, and a game based server system, comprising central game server and protocol manager, configured to connect the players and provide a variety of sub-protocols for carrying out a variety of critical steps in token based games like shuffling of the tokens, dealing of private tokens like hole cards, and subsequent revelation on showdown or the like, in a verifiable and provably fair manner over a network.

According to an exemplary aspect, the present disclosure specifies the method, protocol and apparatus which allows an aforementioned game based server system to host a token based game over a network, for example internet, and conduct it in a manner in which any stakeholder, be it the server or any individual player, can produce sufficient proof for fairness and integrity in conduct of each of the aforementioned critical steps and the overall game. More specifically, for a player, the present disclosure gives provisions to self-enforce and self-verify integrity and fairness in the game and offers high degree of collusion resistance. At a very high level, this is done by involving all relevant players in all the critical steps. The output of each of the critical steps depends directly upon all the inputs given by the players. As a result, no colluding party can predetermine or predict these results, and each player can enforce integrity and fairness in his own capacity. This results in the guarantee that even if the server and every other player colludes against a player, then also that player can be confident that the tokens are shuffled in a random and non-predetermined manner, no one else knows the private tokens dealt to them, no colluding party can change any tokens dealt during the game and/or public tokens are drawn at random and no colluding party can predict or predetermine them, etc.

Protocols for a variety of token-based games in a verifiable and provably fair manner can be created by combining the aforementioned sub-protocols with minor modifications. Examples of such token-based games may include Poker (including at least Texas Hold'me Poker, Stud Poker, Omaha Poker, Draw Poker, and Razz Poker, Dominoes, Durak, Uno. Baccarat, Blackjack and the like without limiting the scope of the disclosure. As an example of this, the complete protocol for carrying out games of Texas Hold'em Poker and 5 Card Draw Poker by employing the sub-protocols are presented later. The methods of hosting and conducting these two games in a provably fair manner comprise steps of: the game based server system hosting a game and specifying its public key, players connecting to the game using their client terminals, client terminals sharing their public key, game based server system assigning roles to the players with digital signature, client terminals signing the previous information and sending back to the server, game based server system instructing the players to submit their cryptographic commitments for carrying out the critical steps with verifiability, the client terminals submitting the commitments, server broadcasting the commitments to all the client terminals, client terminals revealing their permutation token and other participants verifying the corresponding commitments, server and clients terminals determining the final shuffled deck, players determining their hole cards and replacing them if required (as in 5 Card Draw Poker), conducting of betting rounds, revealing of community cards if required (as in Texas Hold'em Poker), revealing of the hole cards by client terminals during showdown, and computing of the winner by the server and the players.

BRIEF DESCRIPTION

Some of the embodiments will be described in detail, with references to the following Figures, wherein like designations denote like members, wherein.

Figure 10:
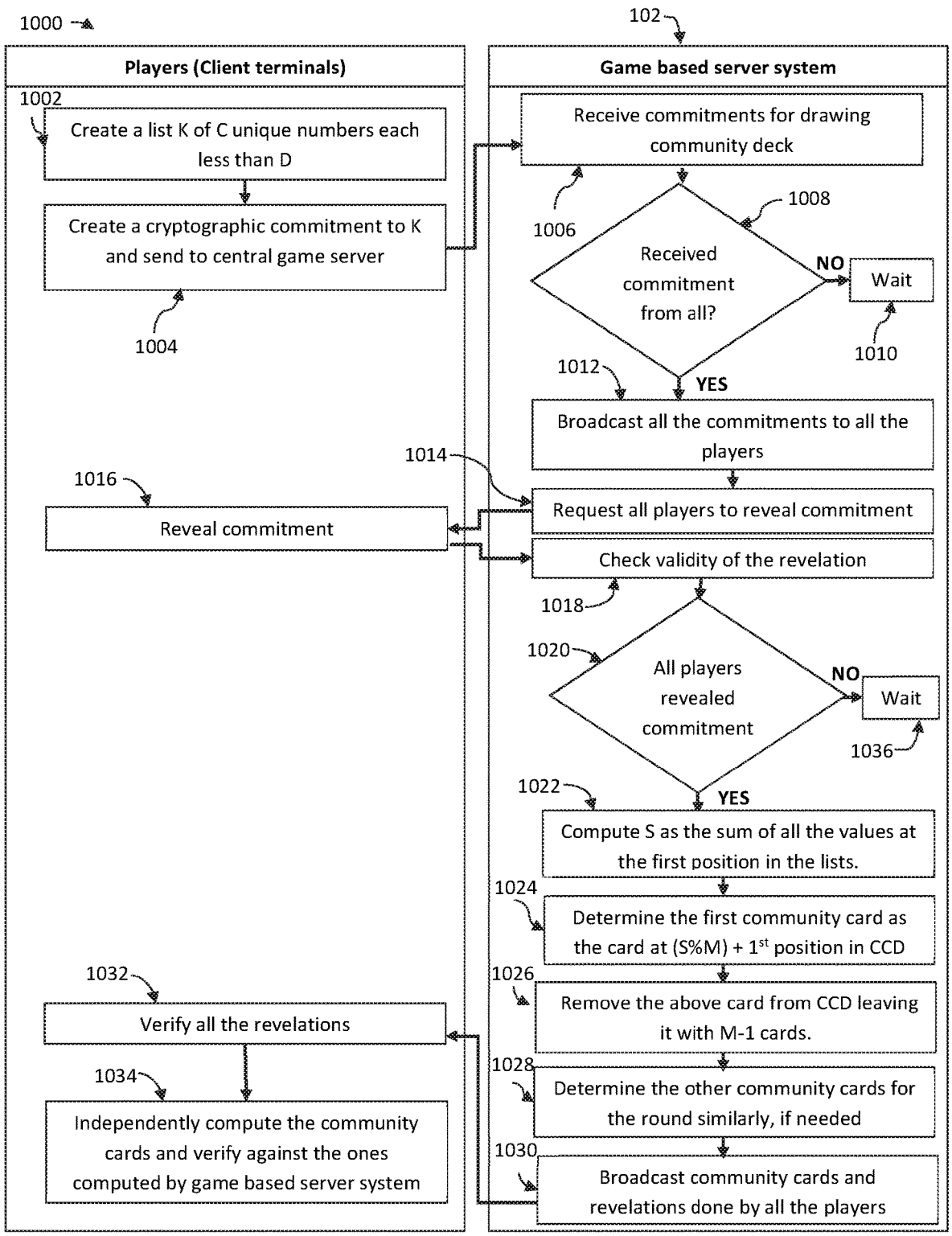
Figure 11:
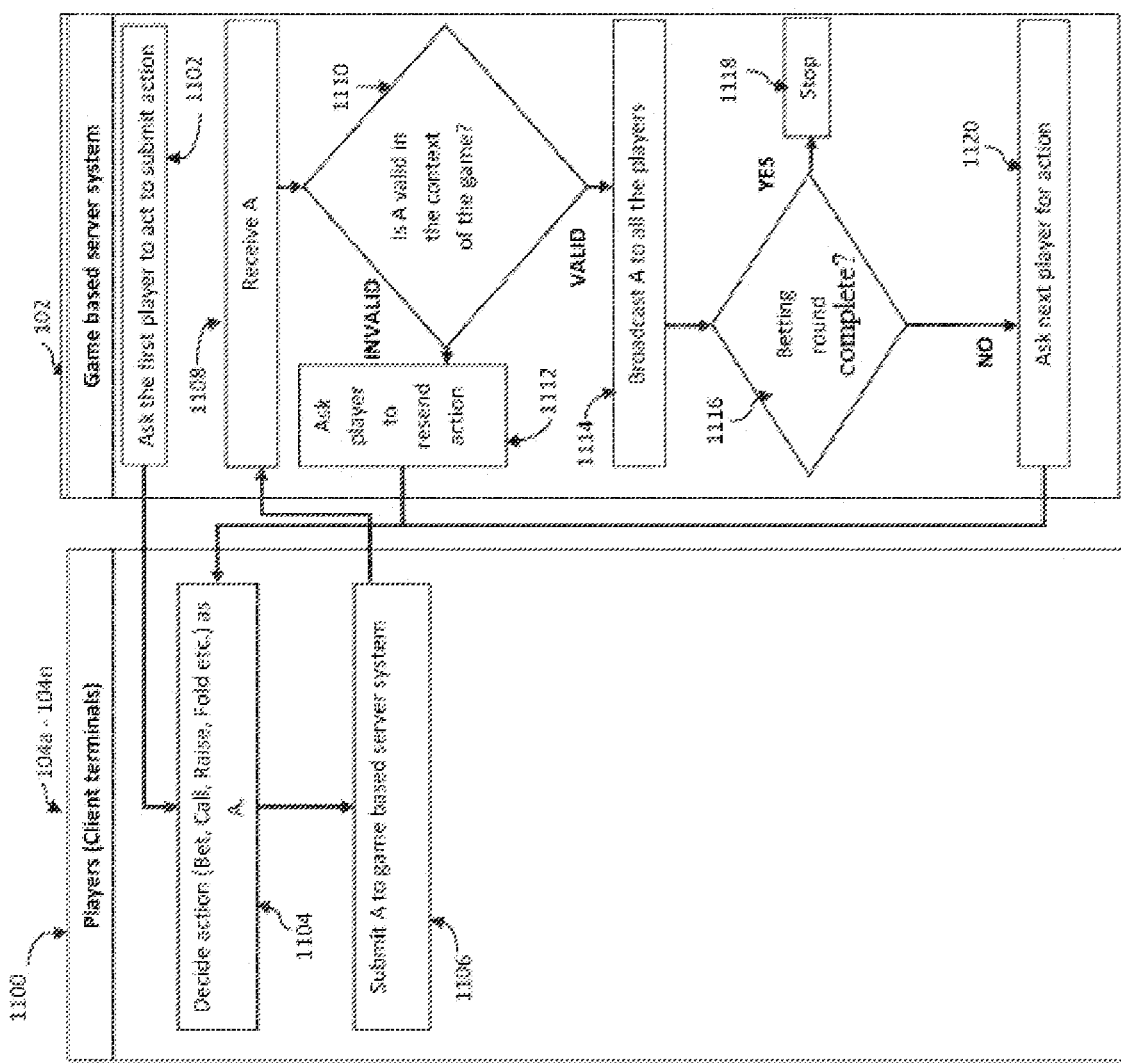
Figure 12:
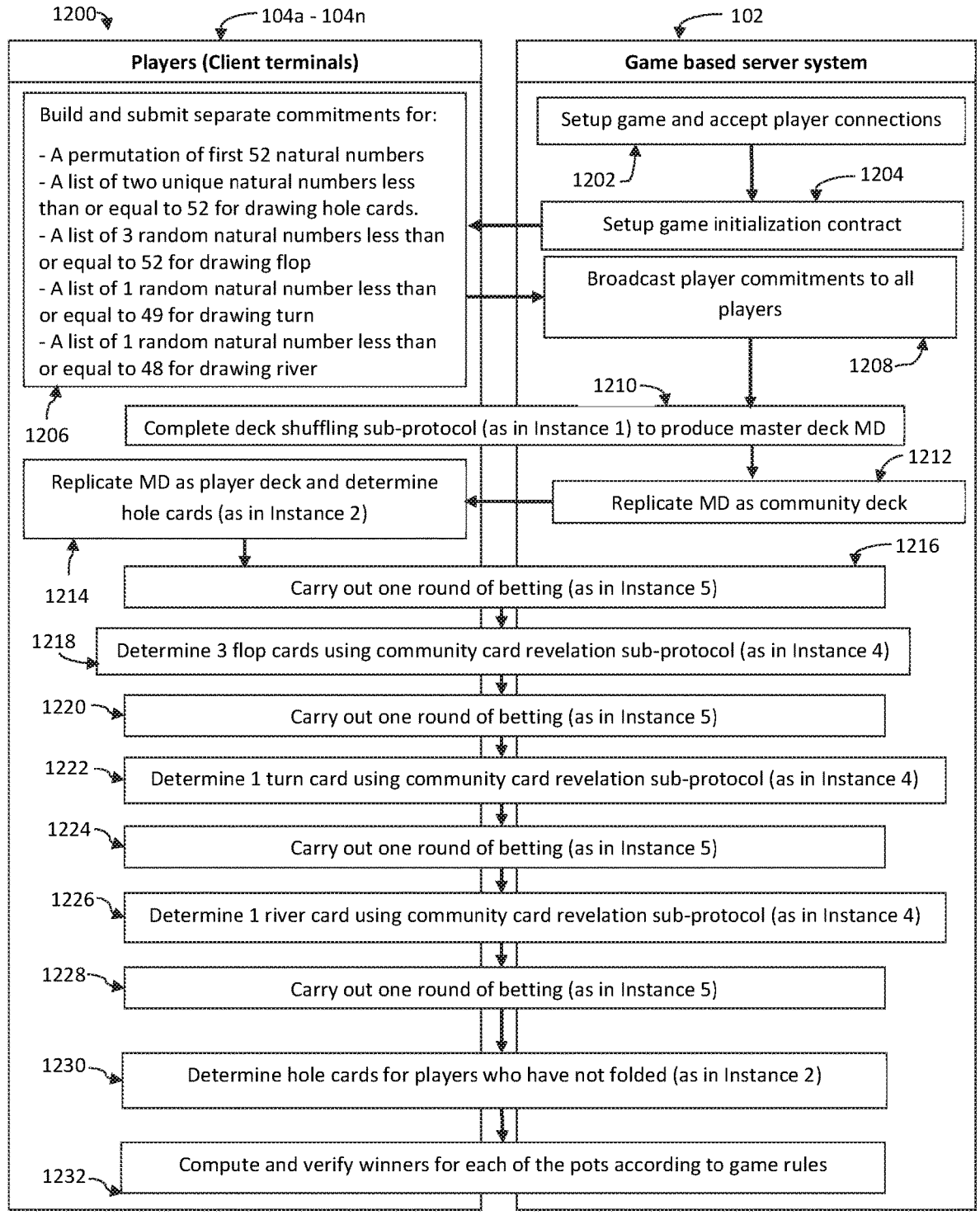

FIG. 10 is a flow diagram depicting a sub-protocol for drawing C community cards from a community (public) card deck CD, having M cards remaining, in a community card opening round, according to an exemplary embodiment of the invention, FIG. 11 is a flow diagram depicting a sub-protocol to carry out a round of betting in a verifiable and provably fair manner, according to an exemplary embodiment of the invention FIG. 12 is a flow diagram depicting a method and protocol for carrying out a game of Texas Hold'em Poker using a standard deck of 52 cards in a verifiable and provably fair manner, according to an exemplary embodiment of the invention.

Figure 13:
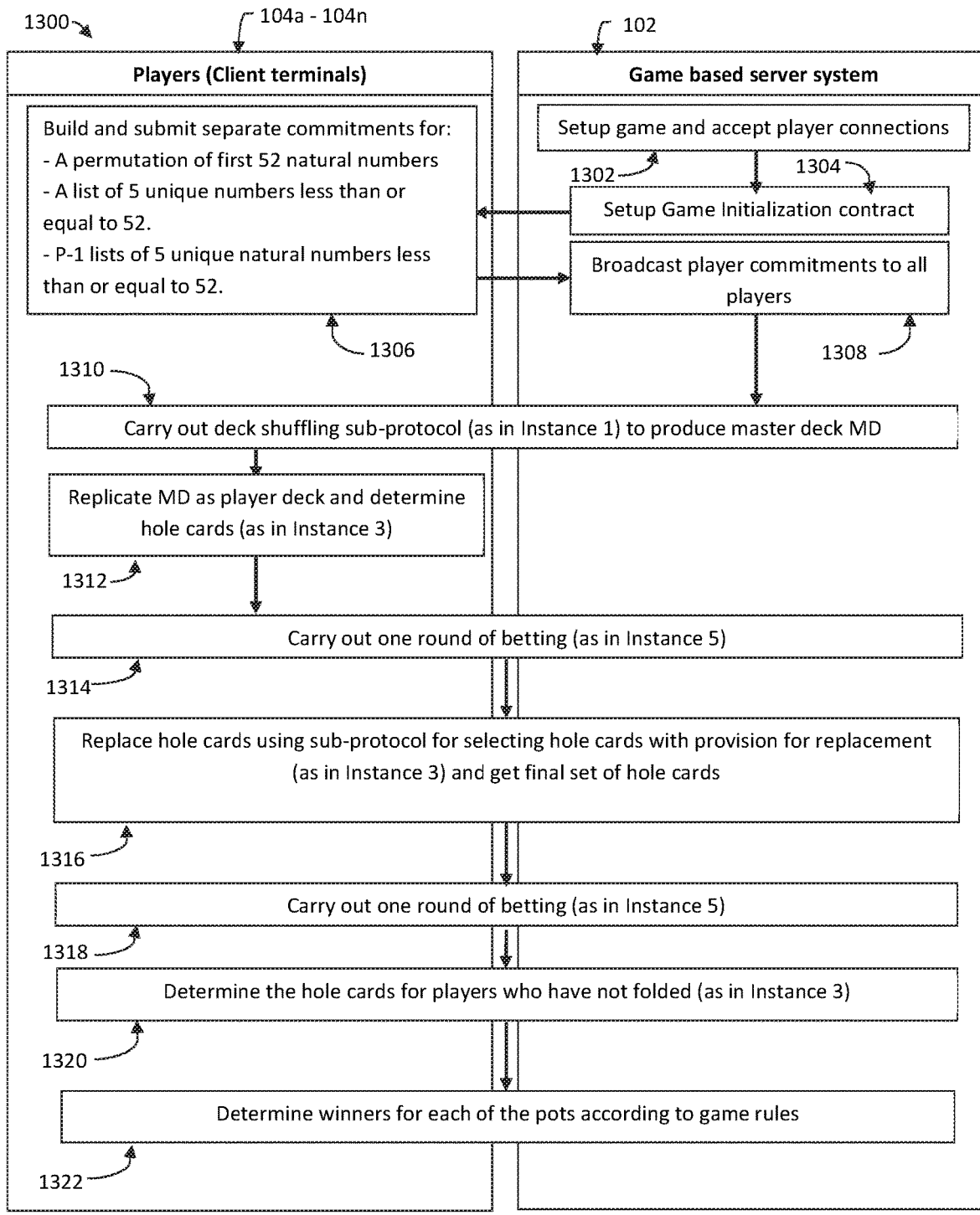
Figure 14:
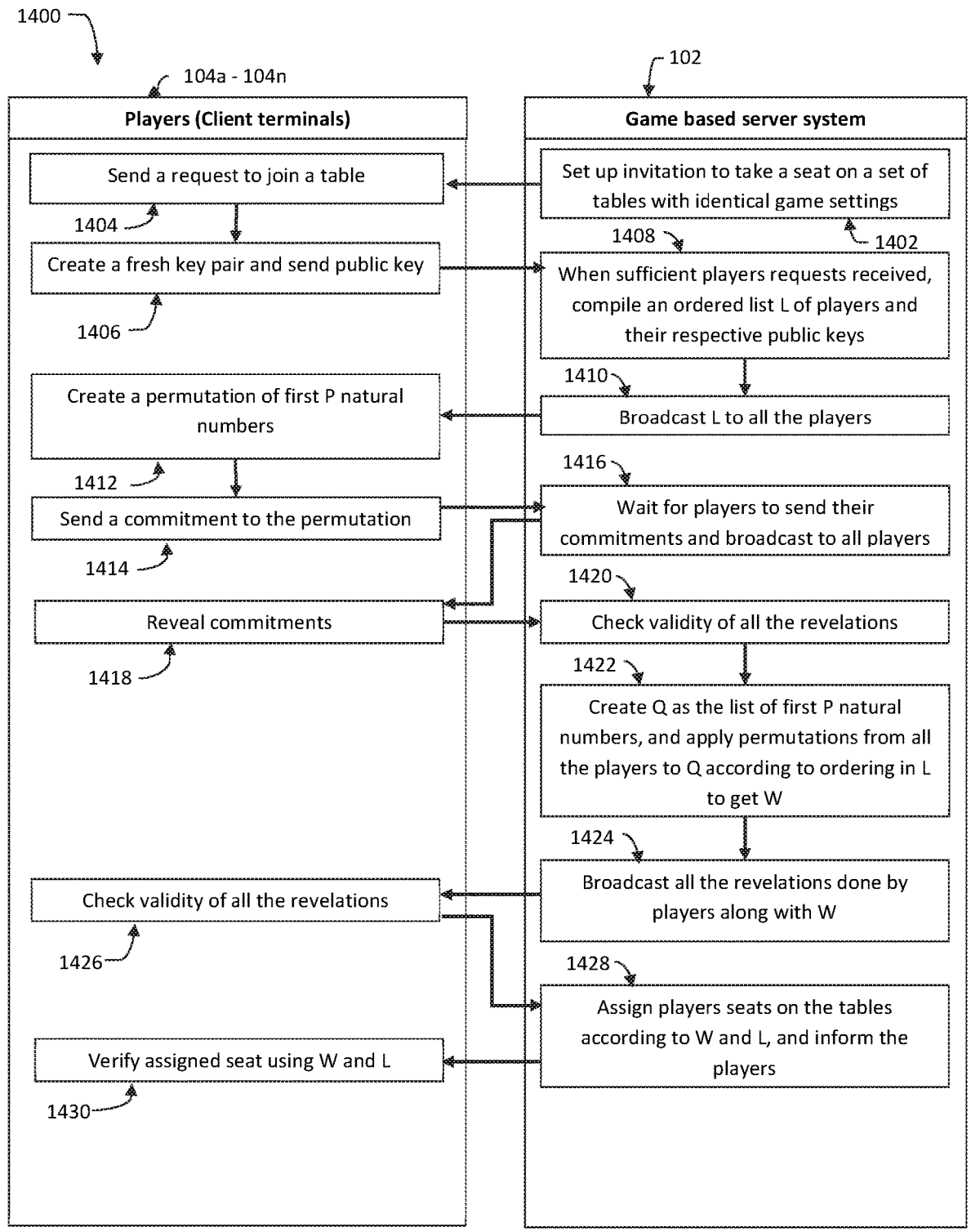

FIG. 13 is a flow diagram depicting a method and protocol for carrying out a game of 5 Card Draw Poker, having P players and using a standard deck of 52 cards, in a verifiable and provably fair manner, according to an exemplary embodiment of the invention; and FIG. 14 is a flow diagram depicting a method and protocol for random assignment of P players to P seats on a set of tables with identical game settings to prevent and minimize chance of collusion, in a verifiable and provably fair manner, according to an exemplary embodiment of the invention.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in many ways. Also, it is to be understood that the phraseology and terminology used herein is for description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first". "second", and "third", and the like, herein do not denote any order, quantity, or importance, but rather are used to distinguish one element from another.

According to a non-limiting exemplary embodiment of the present disclosure, a client-server-based system and method for conducting a token-based game with collusion resistance, provable and verifiable fairness over a digital network is disclosed. This is done by describing sub-protocols for carrying out typical game operations like shuffling the set of tokens, revelation of public tokens, dealing of private tokens or any combination thereof in a verifiable and provably fair manner in the context of a computer network game including but not limited to poker game. These sub-protocols and their modifications thereof can be used for creating complete protocols for verifiable and provably fair versions of various existing token-based games like, Poker, Rummy, Solitaire, Uno, Durak, Dominoes and the like, or a variety of other token-based games to be invented in the future, without limiting the scope of the disclosure. It is to be understood that a variety of new verifiable and provably fair token-based games can be created using the sub-protocols and methods described herein. For demonstration, the protocols for verifiable and provably fair conduct of two popular variants of Poker, namely Texas Hold'em and Draw Poker are described later.

It is to be understood that this embodiment can also be carried out in a decentralized manner without the need of a server, by using a decentralized blockchain ledger like in Bitcoin, or by using smart contracts as in Ethereum. Similarly, the time stamping functionality provided by online blogging services may also be provided by a fast decentralized blockchain in future. Also, the role of the game-based server system could be carried out by a smart contract residing on a blockchain. It is also to be understood that embodiments of the invention can also be used for creating verifiable and provably fair online versions of casino games like Keno, Bingo, table games played against the house like Blackjack, Roulette or any combination thereof, which may be played like a single player online game.

Figure 1:
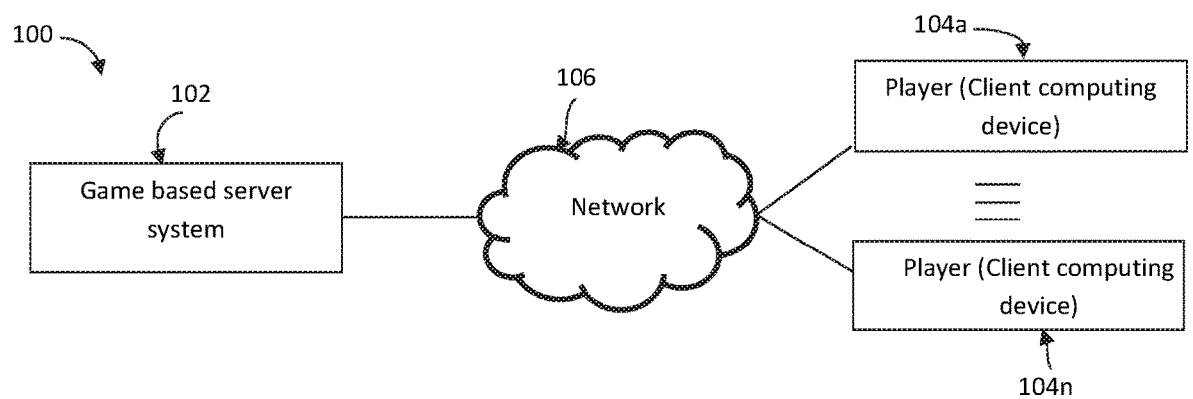
FIG. 1 is a diagram depicting a client-server-based system for collusion resistant, verifiable and provably fair token-based game, according to an exemplary embodiment of the invention.

FIG. 1 is a diagram 100 of a client-server-based system for collusion resistant, verifiable and provably fair token-based game, according to an exemplary embodiment of the present disclosure. In an embodiment, the system includes a plurality of client computing devices 104a-104n (hereinafter also referred to as client terminals), used by players, and a game-based server system 102 connected over a network 106. The network 106 may include, but not limited to, an Ethernet, a Local Area Network (LAN), or a Wide Area Network (WAN), e.g., the Internet, or a combination of networks.

The client-server based system 100 comprises a plurality of client computing devices (hereinafter also referred to as client terminals) like 104a-104n configured with client software to play an online token based game, and a game based server system 102 which comprises a central game server (described below in FIG. 2) configured to connect the players and a protocol manager (described below in FIG. 2) to provide a variety of sub-protocols for carrying out a variety of critical steps in token based games like, shuffling the set of tokens (for example, a deck of cards), revelation of public tokens, and dealing of private tokens in a verifiable and provably fair manner over a network. Similarly, the client terminals are configured to verify the fairness and integrity of the game and raise an alarm to the player in case of any unexpected event, for example, the resulting master deck of deck shuffling sub-protocol (described later) computed by the client terminal 104*a*-104*n* not matching the one computed and supplied by the game-based server system 102.

Client computing devices 104*a*-104*n* can be any processor-driven device, such as a personal computer, laptop computer, handheld computer, and the like, that is utilized by a player to access, join, or play an online game, and for posting of messages on a player owned online blog (hereinafter referred to as player blog). In addition to having a processor, the client computing devices 104*a*-104*n* may further include a memory, input/output ("I/O") interface(s), and a network interface, and the like, without limiting the scope of the disclosure. Further the client computing devices 104*a*-104*n* may include an operating system which is, but not limited to, Microsoft Windows®, Apple OSX™, UNIX, or a mainframe operating system without limiting the scope of the disclosure. The client computing devices may also include primitives for carrying out a game in a verifiable and provably fair manner, such as a digital signature scheme using public key cryptography, a cryptographic hash and a commitment scheme as discussed later.

The client computing devices 104*a*-104*n* may integrate an internet browser or other software, including a dedicated program or mobile software, for interacting with the game-based server system 102. A player may utilize one of the client computing devices 104*a*-104*n* to interact with the game-based server system 102 using client software or via website to access or play one or more example token-based games, as described herein. The multiple client computing devices 104*a*-104*n* may also be utilized to retrieve or otherwise receive data, messages, or responses from the game-based server system 102. It is to be understood that in what follows, all the actions carried out by the players are carried out using their respective client terminals 104*a*-104*n*.

Figure 2:
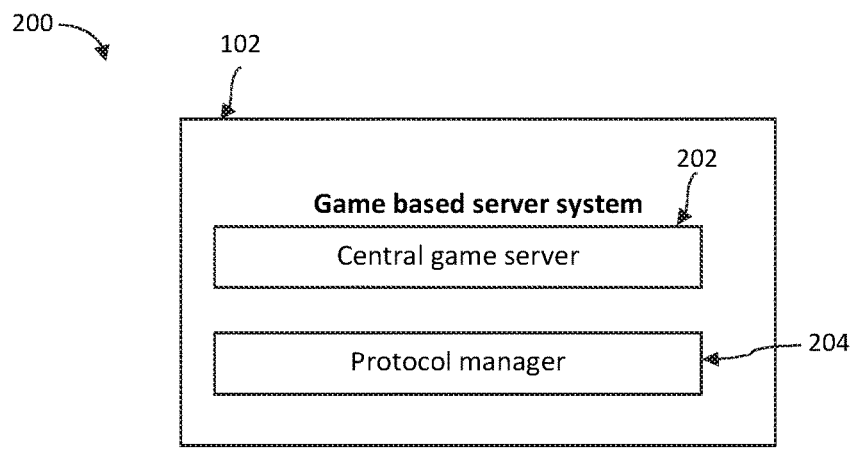
FIG. 2 is a diagram depicting the modules of the game-based server system, according to an exemplary embodiment of the invention.

FIG. 2 is a block diagram 200 depicting modules of the game-based server system 102, according to an exemplary embodiment of the present disclosure. The game-based server system 102 may include a central game server 202 and protocol manager 204. The central game server 202 is configured for hosting the game and accepting authenticated connections from the players using client computing devices 104*a*-104*n*, for example by using a username and password mechanism, and for posting of messages on an online blog (hereinafter also referred to as server blog) owned by the central game server. The central game server 202 also keeps an account of all player profiles, player chip balances, and the like. It is to be understood that, wherever applicable, players play games to win more chips. The central game server 202 is configured for specifying, but not limited to, the protocol to be used for the overall fair conduct of all the critical steps in the game, rules for determining the winners of pots at showdown, and fallback procedures to be used in case of disruption in the normal flow of the game, for example, due to a disconnection (drop out) or failure to communicate on time by any player using client computing device 104*a*-104*n* (FIG. 1).

The protocol manager 204 comprises primitives for carrying out a game in a verifiable and provably fair manner. The primitives may be a digital signature scheme using public key cryptography, a cryptographic hash and a commitment scheme. The digital signature allows a party to digitally sign a message, so that the receiving parties can be sure about the origin of the message, and at the same time enforces non-refutability on the signing party. It works by a pair of digital keys such as public key and private key. The private key is kept secret by the signing party and used for signing the messages. The public key is broadcast to the receiving parties which may verify about the origin of a signed message upon receiving.

A cryptographic hash is a function which takes an input of any size and outputs a non-revertible fixed length string. That is, given an output it is not feasible to find a corresponding input which would lead to the output under the application of the cryptographic hash, for example, SHA-256.

The commitment scheme may allow a party to make a commitment to a certain value and reveal it with verifiability at a later point in time. This primitive is used for making sure that the issuer of the commitment does not change the committed value at the time of revelation. A simple commitment scheme may involve publishing the cryptographic hash of the value committed. To verify, one only needs to compute the cryptographic hash of the revealed value and check it against the hash value published earlier by the issuer of the commitment. If the space from which the value is coming is very small, for example outcome of a coin toss, then the value can be padded with random bits to avoid the value to be discovered from its cryptographic hash by brute force search on the space of inputs.

Further the central game server 202 is configured to assign roles (such as big blind, small blind, etc.) to the players, collect collaterals to discourage malicious disruption of the game or repeated violation of the protocol, defining rules for calculating the value of a player hand at showdown and defining an ordering of the players based on their seating arrangement, etc. before starting the game. As shown later, the ordering would be employed during shuffling of the card deck. Also, the role assignment will be digitally signed by both the players, using their respective client computing devices 104*a*-104*n* (FIG. 1), and the game-based server system 102 to establish proof of participation in the game.

Figure 3:
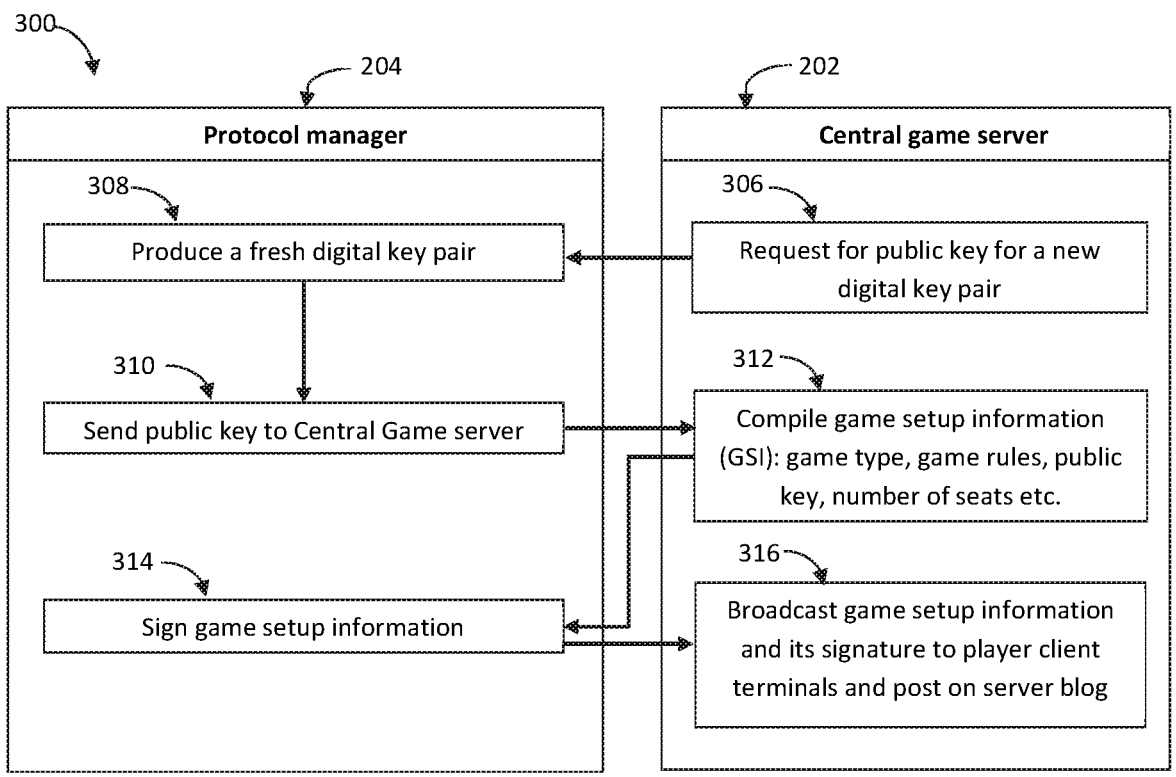
FIG. 3 is a flow diagram depicting the protocol of game-based server system hosting a game and publishing game information, according to an exemplary embodiment of the invention.

FIG. 3 is a flow diagram 300 depicting game-based server system 102 hosting game and publishing game information, according to an exemplary embodiment of the present disclosure. The central game server 202 is enabled to initialize a game by requesting the protocol manager 204 to produce a fresh digital key pair at 306. The protocol manager 204 produces a fresh digital key pair at 308 and sends the public key to the central game server 202 at 310. At 312, the central game server 202 then proceeds to compiling game setup information (hereinafter also referred to as GSI) which may include, but not limited to, specification of the game type and its rules, special rules applying to cases of repeating token denominations (discussed later), maximum time for which central game server 202 is required to wait for a player communication before considering it a disconnection (drop out), number of seats, buy-in limits for entering the game, betting limits, collateral to be collected from each player to discourage dishonest play or disruptions, public key for the game and server blog address for the game. Further at 314, the protocol manager 204 signs the GSI, and finally at 316 the central game server 202 broadcasts the GSI and its signature to player client terminals and posts them to the server blog.

Figure 4:
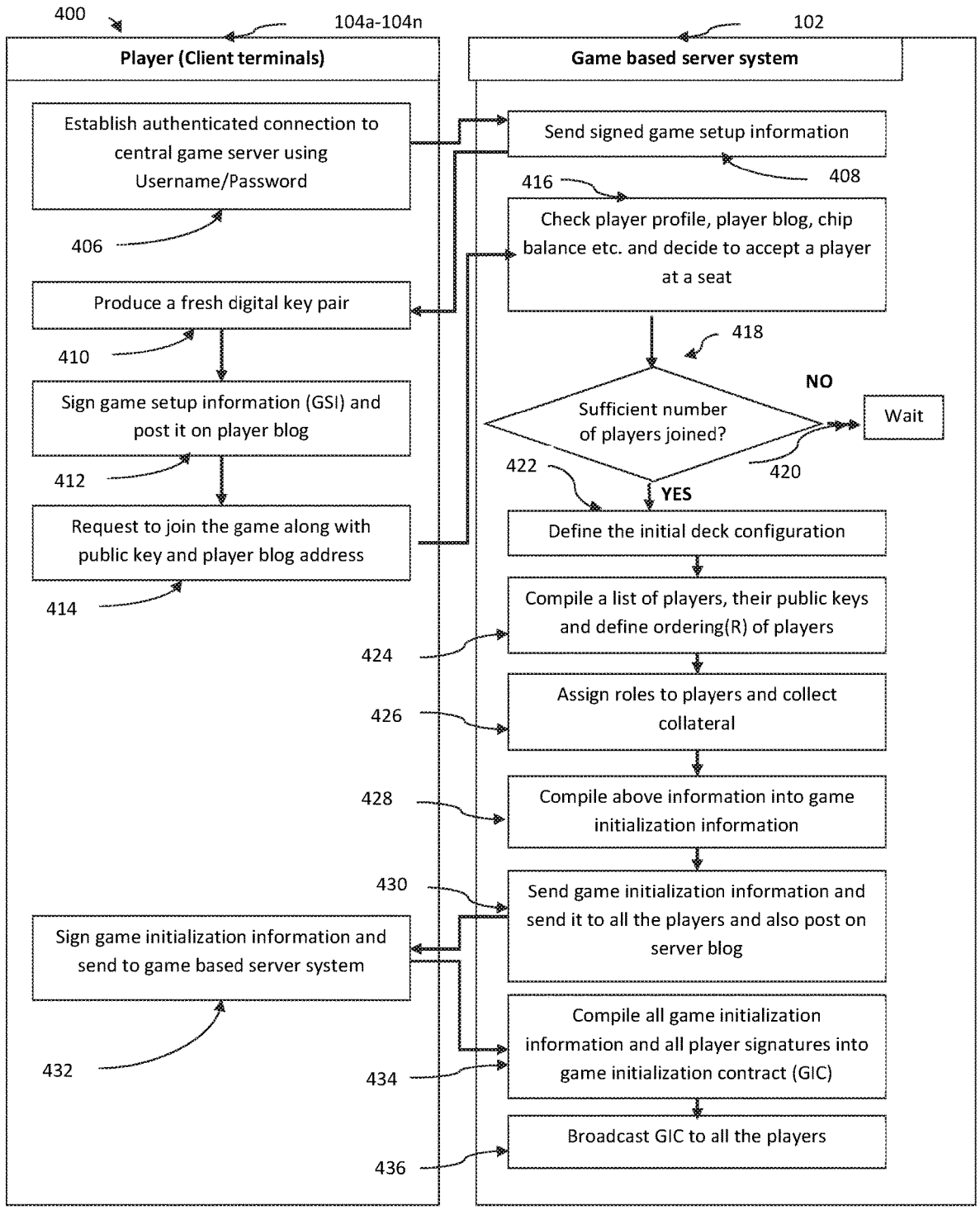
FIG. 4 is a flow diagram depicting a protocol of players joining the game and game-based server system initializing a game, according to an exemplary embodiment of the invention.

FIG. 4 is a flow diagram 400 depicting a method and protocol of players joining the game and game-based server system 102 initializing a game, according to an exemplary embodiment of the present disclosure. Players 104a-104n establish an authenticated connection to the game-based server system 102 using client terminals 104a-104n, for example by the means of a username/password combination at 406 and receive signed GSI for the game at 408. The players 104a-104n may also check the server blog of the game-based server system 102 for the GSI. To join the game, players 104a-104n start by producing a fresh digital key pair at 410 using their client terminals 104a-104n and sign the GSI and post to their player blog at 412 to show a proof of ownership of their player blog address. Next the client terminals 104a-104n send a request to game-based server system 102 to join the game by informing about their public key and player blog address at 414. Upon receiving an authenticated request by a player to join a game, the game-based server system 102 may look at the player's account, balances and player blog and make a decision to accept the player at a seat at 416. Seeing a posting of the signed GSI at the player's blog helps the game-based server system 102 in establishing authentication about the ownership of the player blog and public key by the concerned player.

Once there are sufficient players 104a-104n seated for the game as the first case of 418, the game-based server system 102 defines an initial configuration of the deck of cards, called initial deck configuration, at 422 else there is a wait at the second case of 418, at 420. Initial deck configuration could be an array storing a permutation of representation of denominations of tokens used in the game. For example initial deck configuration for a standard deck of 52 cards could be the array ['As', '2s', '3s', . . . 'Ks', 'Ad', . . . . , 'Kd', 'Ah', . . . , 'Kh', 'Ac', . . . , 'Kc'] where for example 'As' stands for the Ace of spades, "2s" stands for the two of spades, "Ad" stands for the Ace of diamonds, "Kh" stands for the King of hearts, and so on. Further a compilation of the list of players 104a-104n, and their public keys, and defining an ordering (R) of the players 104a-104n at 424 takes place followed by collecting collaterals and assigning them roles like dealer, small blind, big blind etc. at 426 in accordance with their seating arrangement on the game table. Game based server system 102 then compiles all the above information as game initialization information at 428 and signs it and sends the signature to all the players 104a-104n and posts it on the server blog at 430. The players 104a-104n sign the above signature and send it back to the game-based server system 102 at 432, which in turn compiles all the signatures from all the players 104a-104n as game initialization contract (hereinafter also referred to as GIC) at 434 and broadcasts this information to all the client terminals 104a-104n at 436. As a result, all the parties (players 104a-104n and the game-based server system 102) have a proof of the initial setup of the game and all the players 104a-104n have a proof of participating in the game.

Referring to FIG. 1 and FIG. 2, the protocols and sub-protocols described later require transferring messages from the game-based server system 102 to the client terminals and vice versa Some basic principles employed are: When the game-based server system 102 needs to communicate a message to a player, it signs it using protocol manager 204 and sends it directly to the player's client terminal 104a-104n and simultaneously also posts it on the server blog. Similarly, whenever there is a requirement of a communication to be done from the player side, for example, submitting or revealing of commitment or letting to know of the player action during the betting rounds, the game-based server system 102 contacts the player directly and puts this requirement on the server blog. Should there be any problem with the network, or any bad intent on the side of any player, messages may not be received leading to a disruption of the game. The following describes the mechanism for a fault tolerant, non-refutable, reliable, unambiguous and verifiable transfer of a message between a player's client terminal 104a-104n and the game-based server system 102 during the game, and the fall back procedure in case of a player's failure to communicate on time. In this regard, a chronological message corresponding to a message is defined next.

Figure 5A:
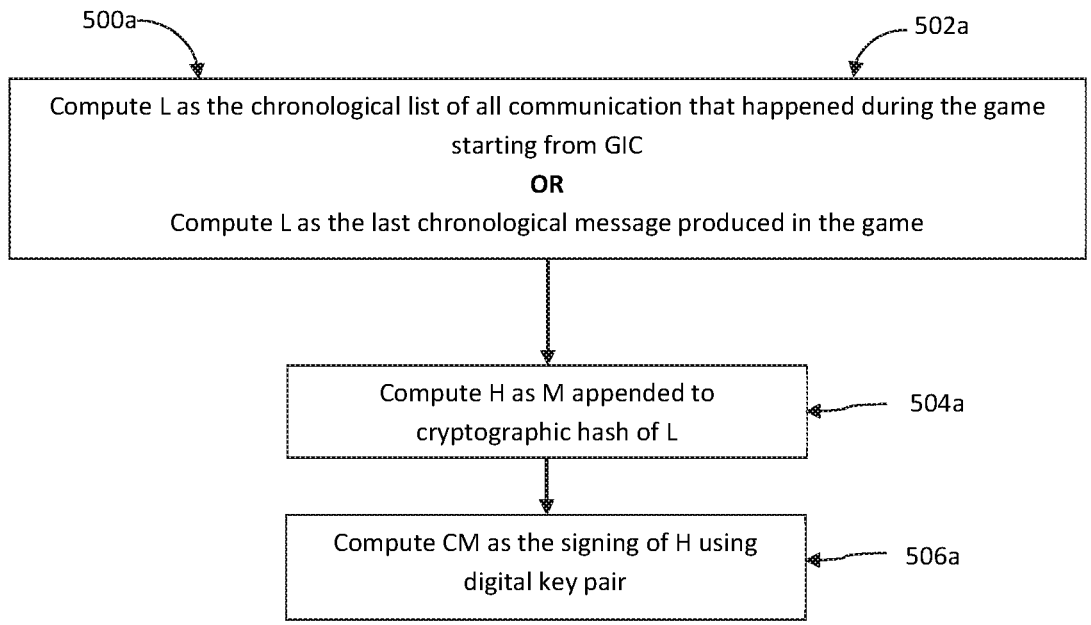
FIG. 5A is a flow diagram depicting a protocol of creating a chronological message CM for a message M, according to an exemplary embodiment of the invention.
Figure 5B:
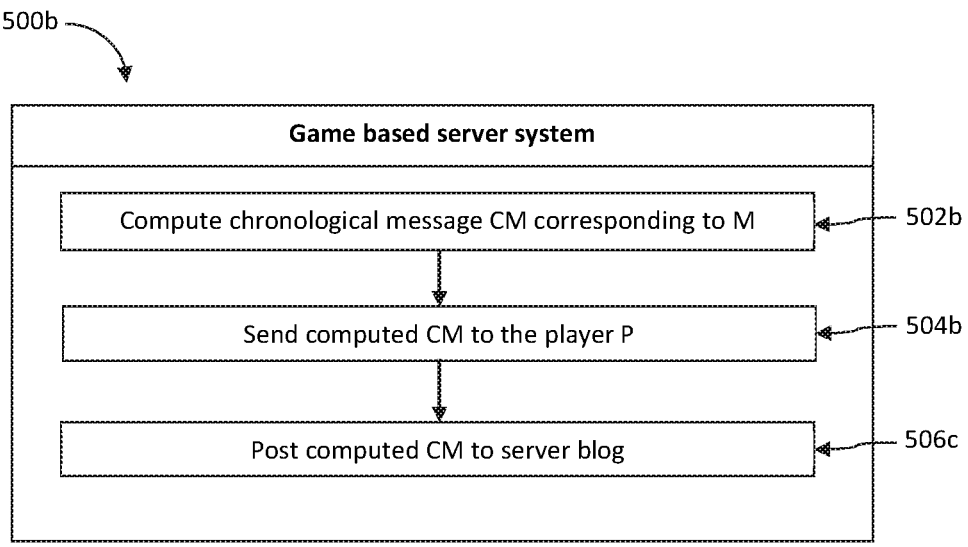
FIG. 5B is a flow diagram depicting a protocol of the game-based server system sending a message M to a player, according to an exemplary embodiment of the invention.
Figure 5C:
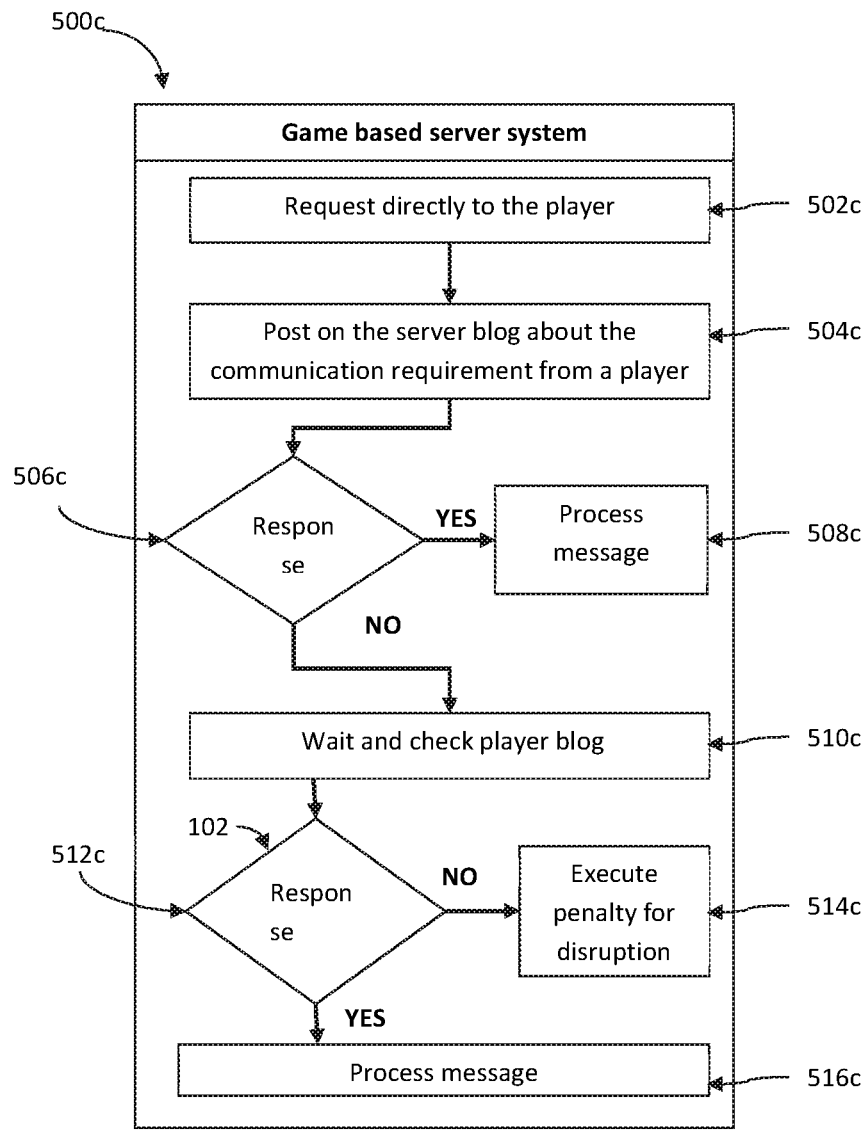
FIG. 5C is a flow diagram depicting a protocol of requesting and obtaining a response from a player, according to an exemplary embodiment of the invention.
Figure 5D:
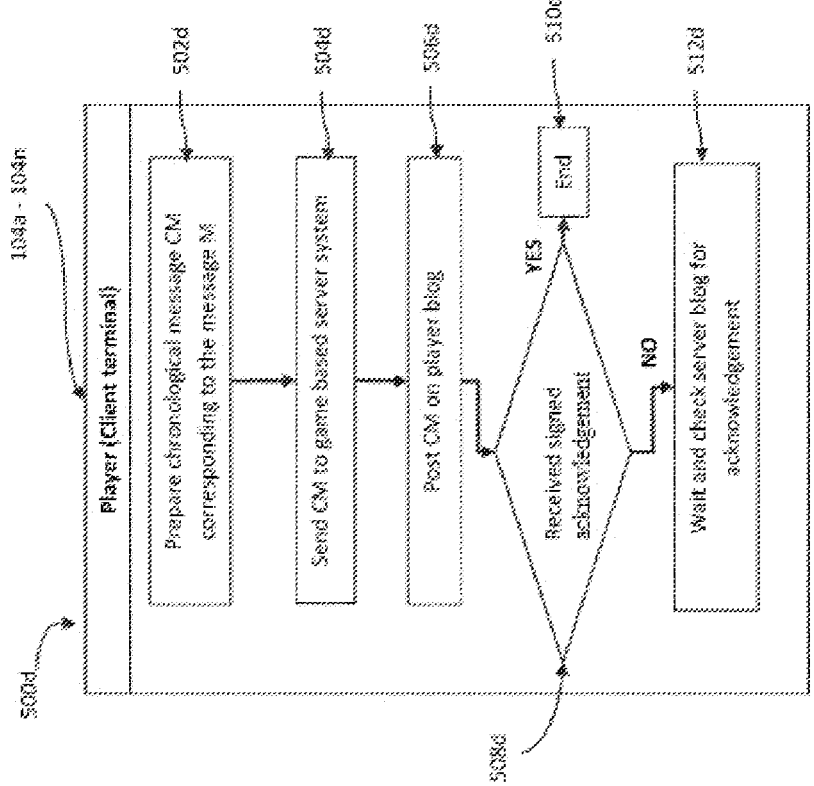
FIG. 5D is a flow diagram depicting a protocol of a player sending a message M to game-based server system, according to an exemplary embodiment of the invention.

FIG. 5A is a flow diagram 500a depicting a method and protocol of creating a chronological message CM for a message M. FIG. 5B is a flow diagram depicting a method and protocol of the game-based server system 102 sending a message M to a player. FIG. 5C is a flow diagram 500c depicting a method and protocol of game-based server system 102 requesting and obtaining a response from a player. FIG. 5D is a flow diagram 500d depicting a method and protocol of a player sending a message M to game-based server system 102, according to an exemplary embodiment of the present disclosure. Referring first to FIG. 5A, L is computed as the chronological list of all communications that happened during the game starting from GIC or, for practicality, L may be computed as the last chronological message produced in the game at 502a. The chronological message CM corresponding to a message M is computed by first appending of M to a cryptographic hash of L, as in 504a, to obtain H, followed by the digital signing of H using a digital key pair at 506a. The purpose of transmitting a corresponding chronological message CM instead of the original message M is to prevent replay attacks and to establish non-refutability. Since a chronological message carries a digital signature, posting of a chronological message by an entity also establishes that they agree to the current state of the game starting from the issuing of GIC. This removes ambiguity and makes it easy for any player 104a-104n or the game-based server system 102 to verify that the game is carried out with integrity. It is to be noted that, unless mentioned otherwise, starting from the issuing of the GIC, sending or posting of messages on blogs in all the protocols and sub-protocols mentioned in rest of the text would be done thorough the means of chronological messages only.

Note that transmission of messages done during the sub-protocols and protocols described in the text are public in nature in the sense that discovery of those messages by anyone does not compromise the integrity of the game. So, every message sent out by an entity (players 104a-104n or game-based server system 102) is also immediately posted on their respective blog (a player blog or server blog as the case may be) for establishing a backup line of communication and for time stamping. Similarly, whenever an entity does not receive an expected communication (due to some problem in the network or otherwise): it checks the blog of the sender to retrieve the communication. The specific cases of communication are described in detail next.

FIG. 5B is a flow diagram 500b, when the game-based server system 102 needs to send a message M to a player 104a-104n, then it prepares the corresponding chronological message CM at 502b and sends it to the player 104a-104n at 504b, and immediately posts it on the server blog as well at 506b. An example of such a message could be the game based server system 102 sending the computed master deck to all the players 104a-104n during the deck shuffling sub-protocol, described later in this text.

Referring to flow diagram 500c in FIG. 5C, when the game-based server system 102 needs to obtain a response from a player 104a-104n in order to advance a game, then a request is presented directly at 502c and this request is also posted immediately on the server blog at 504c. An example of such a scenario could be the game based server system 102 requesting all the players 104a-104n to submit their cryptographic commitments for deck permutation during the deck shuffling sub-protocol, described later in this text. Further at 506c game-based server system 102 checks if a response has been received, then the game-based server system 102 processes it, as described later in FIG. 6, at 508c and the process stops. If the response is not received, the game-based server system 102 waits for some time and checks the player's respective blog at 510c. If at 512c, a response is not found within a specified amount of time, as determined by the time stamps on the messages on the player's blog and in accordance with the waiting time rules set out in GSI, game-based server system 102 declares the player 104a-104n as disconnected (dropped out). At 514c, the game-based server system 102 may then proceed to carry out a penalty against the defaulting player 104a-104n based on the severity of disruption to the game. For example, the penalty for a player 104a-104n getting disconnected (dropping out) during a betting round could be folding of the hole cards and removing their claims from all the pots. In case a response is found within the waiting time, then the message is processed, at 516c, as described later in FIG. 6.

Referring to flow diagram 500d in FIG. 5D, whenever a player 104a-104n using a client terminal 104a-104n needs to communicate a message M to a game based server system 102, it prepares a chronological message CM corresponding to the message M at 502d, and sends it to the game based server system 102 at 504d, and also immediately posts the CM on the player blog at 506d. An example of such a communication could be players 104a-104n sending their commitments for deck permutation during the deck shuffling sub-protocol described later. Further at 508d, the player 104a-104n checks if a signed acknowledgement is received and in case of acknowledgement the process ends at 510d. Otherwise, at 512d, the server blog is checked for a signed acknowledgement after waiting for some time.

Figure 6:
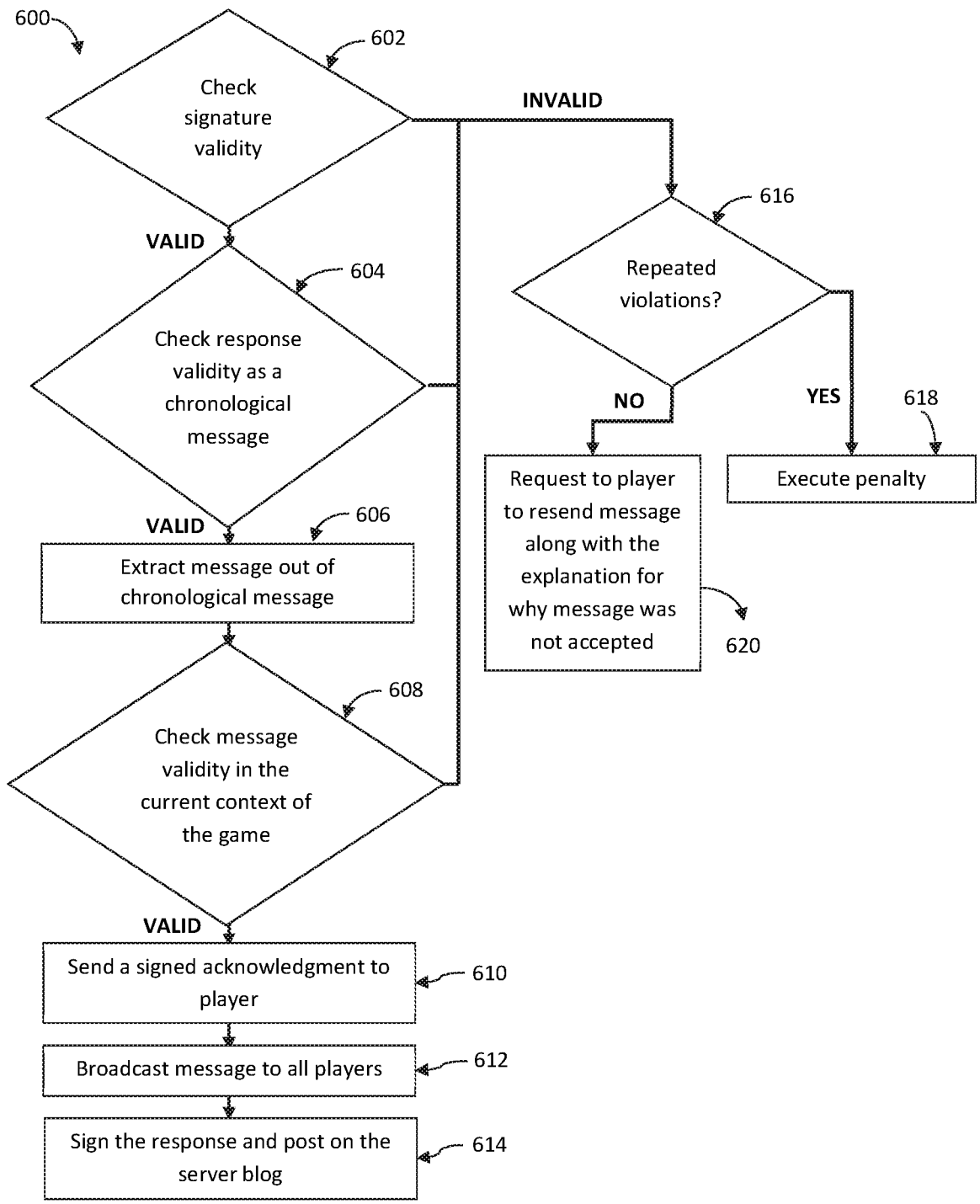
FIG. 6 is a flow diagram depicting a protocol of processing a response received from a player's client terminal by game-based server system, according to an exemplary embodiment of the invention.

FIG. 6 is a flow diagram 600, depicting a method and protocol of processing a response received from a player's client terminal 104a-104n by game-based server system 102, according to an exemplary embodiment of the present disclosure which starts at 602 where the validity of the signature is enquired against the public key of the player 104a-104n. In case of repeated violations, as represented in 616, a penalty is executed at 618 based on the severity of disruption caused to the game, and in case, if no repeated violations then a request is put up to the player 104a-104n to resend message along with an explanation for why message was not accepted at 620. Further, response is checked for being a valid chronological message in 604. If yes, then the corresponding message is extracted out of the chronological message at 606, and validity of the message in the current context of the game is enquired at 608. If yes, then the game state is updated, and a signed acknowledgement is sent to the player 104a-104n at 610 and if no, then the process resumes at 616 as explained earlier. Further at 612, the response is broadcast to all the client terminals 104a-104n and finally at 614a response is signed and posted on the server blog.

As mentioned earlier, an online token-based game requires a set of critical game operations to be performed. For example, a game of Texas Hold'em Poker requires support for shuffling deck, dealing face down (hole) cards, dealing face up (community) cards, provision for registering player actions like betting, calling, raising, folding etc., and showdown. A game of Draw Poker on the other hand also requires support for allowing players to replace their hole cards. In the following, verifiable and provably fair sub-protocols for carrying out each of these critical game operations are described. It is to be understood, that sub-protocols for carrying out critical steps in other token-based games, newly invented games in future or table games can similarly be created.

Instance 1 (Considering an instance of sub-protocol for shuffling a virtual deck of cards): The purpose of this sub-protocol is to produce a shuffled deck of cards, called the master deck starting from an initial deck configuration defined by IDC. The sub-protocol shuffles the deck in a manner which cannot be predetermined or predicted by any colluding party. The including steps are: given the card deck of size D (usually 52) in IDC, all the client terminals 104a-104n independently produce a random permutation of the first D natural numbers. Client terminals 104a-104n create a cryptographic commitment to their permutation. Client terminals 104a-104n send their commitments to the game-based server system 102. When commitment for the permutation is received from all the players, then the game-based server system 102 broadcasts it to all the players 104a-104n. The players 104a-104n then send (reveal) their respective permutations to the game-based server system 102. The game-based server system 102 checks the validity of all the revelations. The game-based server system 102 applies all the permutations to the IDC one by one according to the aforementioned ordering R to obtain master deck. The game-based server system 102 broadcasts the master deck along with all the revelations of the permutations done by players 104a-104n to all the client terminals 104a-104n. All the players 104a-104n similarly and independently compute the master deck from IDC applying the permutations submitted by players 104a-104n in the order defined by R. and check whether it is identical to the master deck game-based server system 102 had sent. Further, each of the players independently replicate the master deck as their player deck for drawing their hole cards, and the game-based server system 102 replicates the master deck as the community deck for drawing community cards. The details of this method and protocol are provided next. It is to be understood that it is possible to similarly create several other ways of shuffling a set of tokens.

Figure 7:
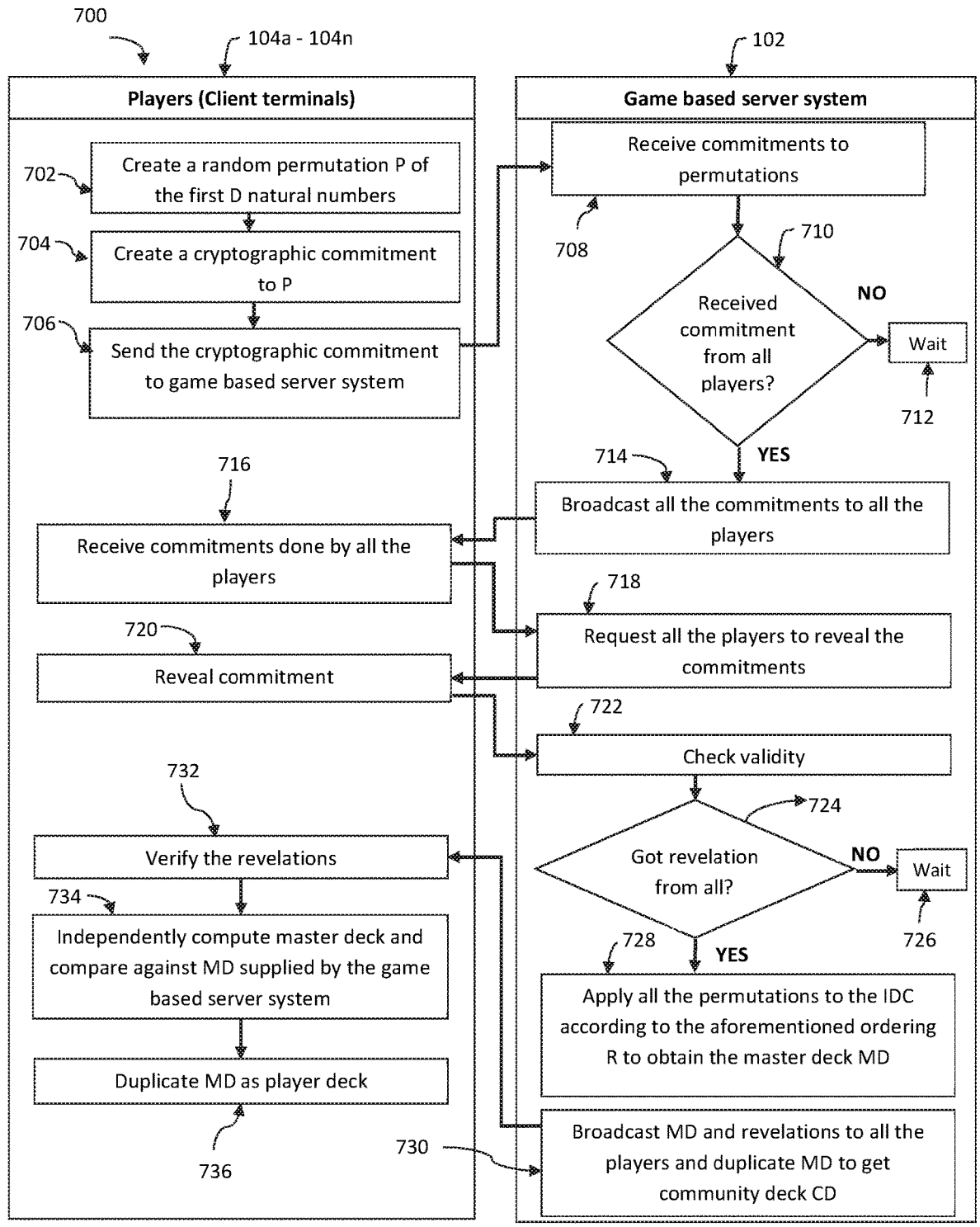
FIG. 7 is a flow diagram depicting a sub-protocol for shuffling a deck of D cards to obtain a master deck MD starting with an initial deck arrangement defined by IDC and player ordering defined by R, according to an exemplary embodiment of the invention.

FIG. 7 is a flow diagram 700: depicting a sub-protocol for shuffling a deck of D cards to obtain a master deck MD starting with an initial deck arrangement defined by IDC and player ordering defined by R, according to an exemplary embodiment of the present disclosure. The process starts at 702 with each player 104a-104n independently creating a random permutation P of the first D natural numbers. A cryptographic commitment to P is created at 704. Further at 706, the client terminals send the cryptographic commitment to game-based server system 102. 708 proceeds to game-based server system 102 where the receipt of commitment from all players 104a-104n is enquired at 710. If the answer is no then there is a wait period at 712, else if it is a yes, then at 714, a broadcast of all the commitments received is done to all the players 104a-104n. Further, these commitments are received by all the players 104a-104n at 716. A request is put up by game-based server system 102 to all the players 104a-104n to reveal their commitments at 718. Further at 720 the respective commitments are revealed by all the players 104a-104n. The validity of the commitments is checked by the game-based server system 102 at 722. An enquiry whether revelations have been received from all the players 104a-104n is done at 724. If no, then there is a wait period at 726, else if it is a yes, as at 728, all the revealed permutations are applied to the IDC according to the aforementioned ordering R to obtain the master deck MD. MD is broadcast along with all the permutation revelations to all the players 104a-104n and MD is duplicated to get community deck at 730. Further, the revelations are verified at 732 by all the players 104a-104n. Also, the master deck is computed independently by all the players 104a-104n and compared against the MD supplied by the game-based server system 102 at 734, and finally at 736 MD is duplicated as player deck.

Instance 2 (Considering an instance of sub-protocol for a player to select H hole cards from a player deck with D cards, with provision for showdown): The sub-protocol for doing this in a verifiable and provably fair manner, as described next, only reveals the player's hole cards only when he reaches the showdown, thereby, preventing the revelation of the strategy of the player in case he chose to fold during the game. The including steps are: To pick H hole cards, each of the players 104a-104n make a cryptographic commitment to H unique natural numbers each less than or equal to D, while or before making their commitment for the shuffle permutation (as in Instance 1) and sends it to the game-based server system 102. Once master deck MD is determined (as in Instance 1), each player 104a-104n independently creates a replica player deck PD from MD. Each player 104a-104n determines their hole cards as the cards in the respective positions in PD as specified by the H unique numbers previously committed by them. For showdown, a player 104a-104n who has not folded simply reveals the list of H unique numbers committed to the game-based server system 102. The game-based server system 102 checks the validity of the commitment and determines the player's 104a-104n hole cards using MD and broadcasts this whole information to the rest of the players 104a-104n. The rest of the players 104a-104n also independently check the validity of the revelation of the commitment and the computed hole cards for verification. The details of this method are provided next. It is to be understood that it is possible to similarly create several other ways of dealing tokens privately to players.

Figure 8:
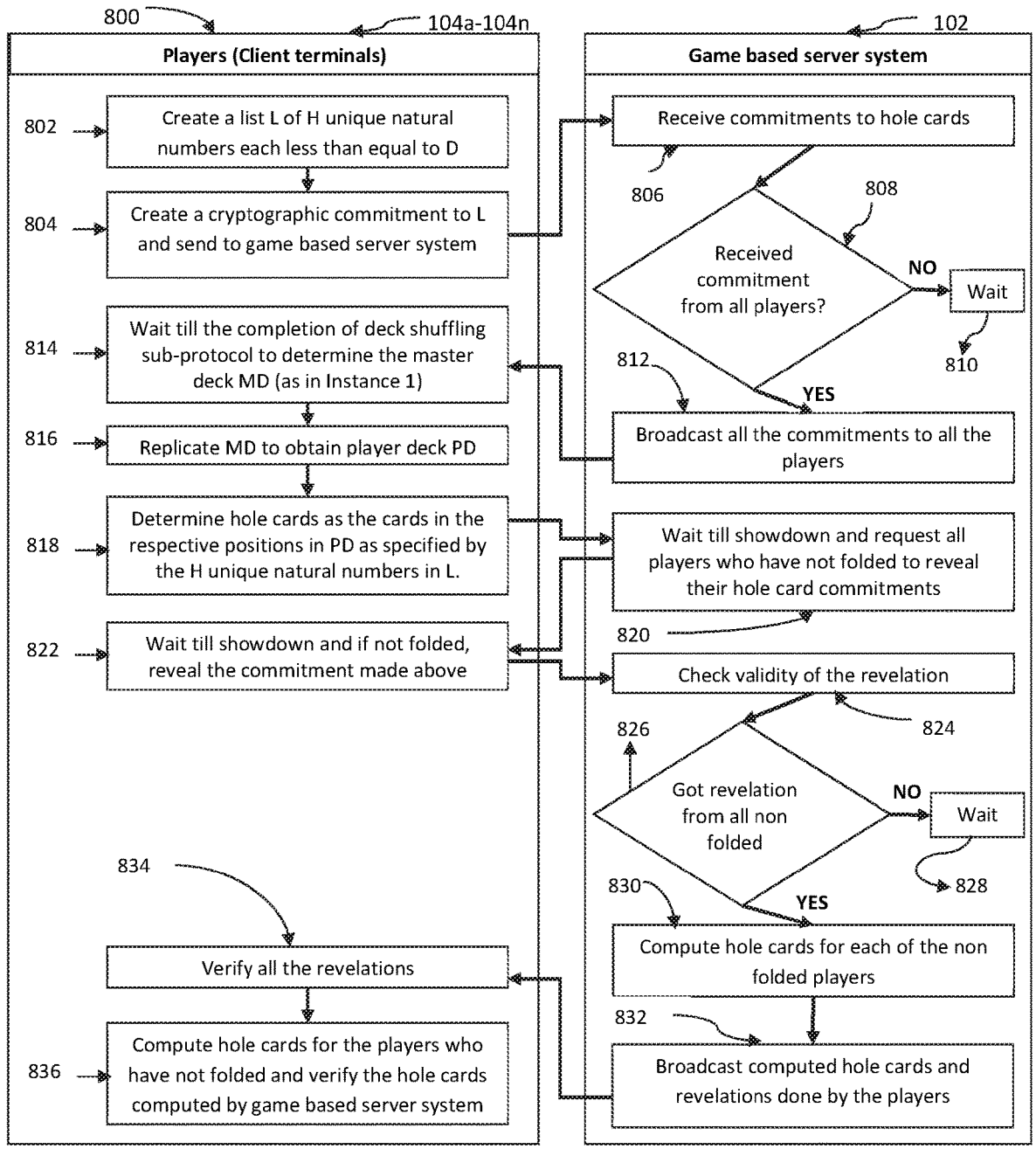
FIG. 8 is a flow diagram depicting a sub-protocol for a player to select H hole cards from its player deck PD having D cards, with provision for showdown, according to an exemplary embodiment of the invention.

FIG. 8 is a flow diagram 800 depicting a sub-protocol for a player to select H hole cards, from its player deck PD having D cards, with provision for showdown, according to an exemplary embodiment of the present disclosure. The process starts at 802 where a list L of H unique natural numbers each less than or equal to D is created independently by each of the players 104a-104n. A cryptographic commitment to L is created and sent to game-based server system 102 at 804. Commitments to hole cards are received by game-based server system 102 at 806. A receipt of commitment from all players 104a-104n is enquired at 808. If no, then there is a wait at 810. If yes, then all the commitments to all the players 104a-104n are broadcast at 812. There is a wait till the completion of deck shuffling sub-protocol (as in Instance 1) to determine the master deck MD at 814. MD is replicated by players to obtain their player deck PD at 816. Determination of the hole cards as the cards in the respective positions in PD as specified by the H unique numbers in L is done at 818. The 820 proceeds to game-based server system 102, where it waits till showdown and subsequently requests all players 104a-104n who have not folded to reveal their hole card commitments at 820. Further at 822, players 104a-104n wait till showdown and if not folded, reveal their respective commitments made above. The validity of the revelation is checked at 824 by game-based server system 102 followed by an enquiry about the receipt of revelations from all the non-folded players 104a-104n at 826. If no, then there is a wait at 828, else hole cards are computed for each of the non-folded players 104a-104n at 830. The computed hole cards are broadcast, along with the revelations done by players 104a-104n who have not folded, at 832. All the revelations are verified at 834 by all the players 104a-104n. And finally, at 836, the hole cards are computed for the players 104a-104n who have not folded and verified against the hole cards computed and broadcast by game-based server system 102 previously at steps 830 and 832 respectively.

Some games like stud poker require dealing of a face-up door card along with the 2 face-down hole cards. It is easy to see that the door card can dealt to a player immediately revealing the commitment corresponding to the door card, instead of waiting till show down. It is also to be noted that since each player independently draws hole cards from their own player decks replicated from the master deck, the present disclosure potentially allows a game-based server system 102 to host a verifiable and provably fair online token-based game with unlimited number of players competing with each other. Also, players drawing hole cards from their own replicated player deck also eliminates any chance of a colluding party gaining any statistical information about the hole cards of an honest (non-colluding) player. For example, in a regular game of Texas Hold'em Poker, a colluding party of 4 players would know that any other player would not be having any of the hole cards held by them. This advantage is significant in a game like Omaha Poker, where 4 players would be dealt a total of 16-hole cards.

Instance 3 (Considering an instance of sub-protocol for a player to select H hole cards from a player deck with D cards, in a game with P players with provision for replacement of cards and subsequent showdown): Some games like Draw Poker need a player to be dealt 5 cards. The players then choose the set of cards he wishes to keep, and the rest of the cards are replaced with new cards. The sub-protocol for doing this in a verifiable and provably fair manner, as described next, ensures that no player or any colluding party can predict or predetermine any players' hole cards or replacement cards, and only reveals the player's hole cards when he reaches the showdown, thereby, preventing the revelation of the strategy of the player in case he chose to fold during the game. The including steps are: Every player 104a-104n makes a commitment to H unique natural numbers each less than or equal to D (usually 52), while or before making their commitment for the shuffle permutation (as in instance 1). Every player 104a-104n also makes commitment to P−1 lists of H random numbers each, one for each of the other players. Mapping of a list to a player is done using the aforementioned ordering R. Once the master deck MD is determined using the deck shuffling sub-protocol (as in instance 1), each player 104a-104n independently creates a replica player deck PD from MD. Every player 104a-104n determines their hole cards as the cards in the respective positions in their PD as specified by the H unique numbers previously committed, and separates them, leaving their PD with D-H cards. Over the course of the game, each player 104a-104n may then specifies the positions of the hole cards which they want to get replaced and sends this information to the game-based server system 102 which waits for all the players 104a-104n to submit their card replacement requirements and then broadcasts that information to all the players. Each of the players 104a-104n then reveals their commitments for the P-1 lists. Every player 104a-104n determines and enlists the lists created for self by other players 104a-104n. Each player 104a-104n who has specified to replace any cards computes the position of the first replacement card using the sum(S) of the first elements of the lists created for him along with the first element in H, as the card at S % (D-H)+1th position in their player deck, leaving player deck with D-H-1 cards. Other (second, third, fourth etc.) replacement cards are similarly drawn one by one, if there is a need, using the respective (second, third, fourth etc.) elements in the lists, leading to final set of hole cards. For showdown, every non-folded player 104a-104n simply reveals the list of H unique numbers which he had initially committed to the game-based server system 102, and the game-based server system 102 then broadcasts this information to all the players 104a-104n. Since the corresponding P-1 lists from each the players are already revealed, it is possible for the game-based server system 102 and each of the players 104a-104n to compute and verify the final hole cards after replacements for players 104a-104n who have not folded. The details of this method are provided next. It is to be understood that it is possible to similarly create several other ways of dealing tokens privately to players while allowing provision for replacement.

Figure 9:
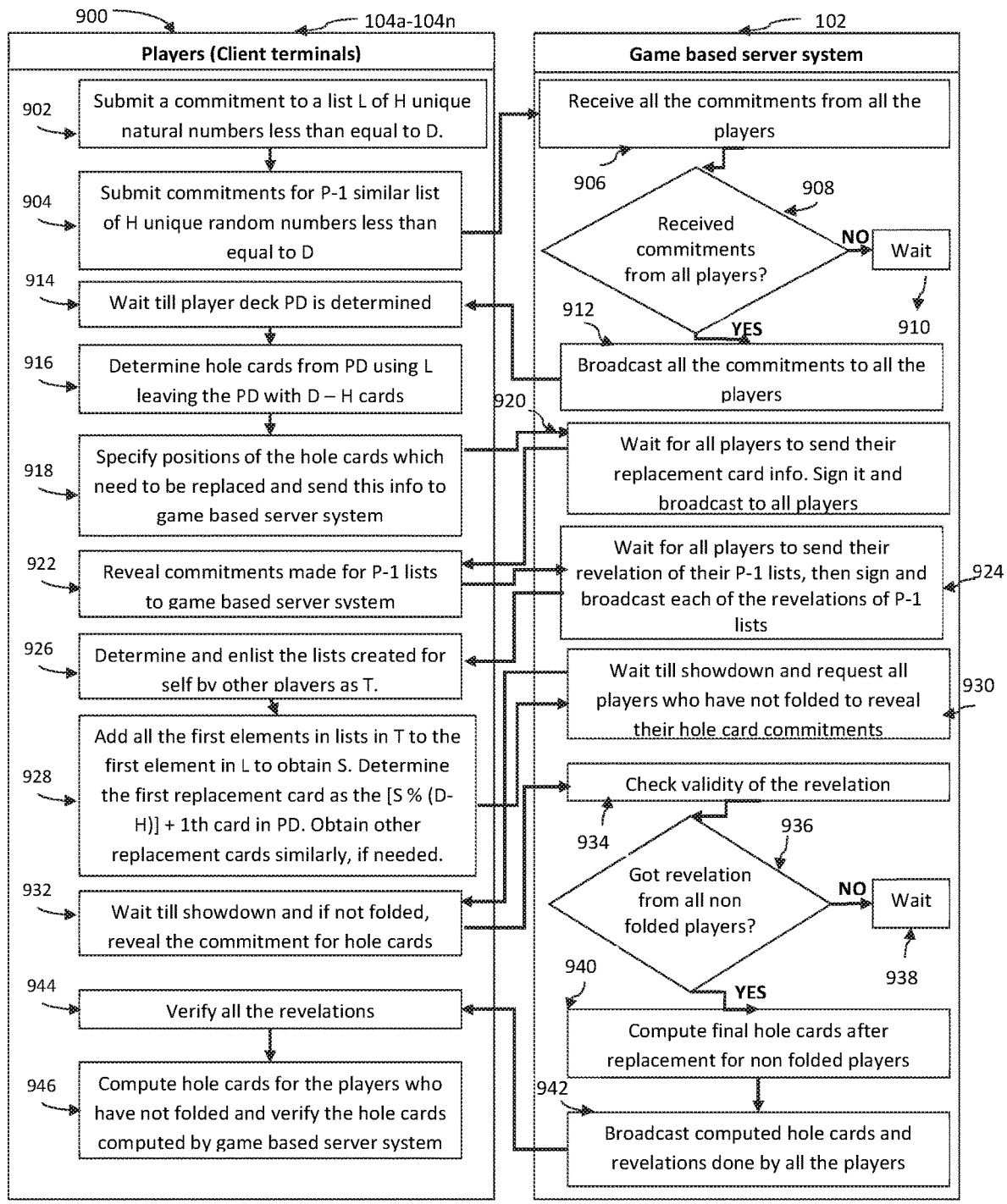
FIG. 9 is a flow diagram depicting a sub-protocol for players to select H hole cards from a player deck PD having D cards, with provision for replacement of cards and subsequent showdown, in a game with P players in an ordering R, according to an exemplary embodiment of the invention.

FIG. 9 is a flow diagram 900; depicting a sub-protocol for players to select H hole cards from a player deck PD having D cards, with provision for replacement of cards and subsequent showdown, in a game with P players in an ordering R, according to an exemplary embodiment of the present disclosure. This can be further explained with the help of the description of the flow diagram wherein the process starts at 902 where a submission of a commitment to a list of H unique natural numbers less than or equal to D takes place by each of the players 104a-104n. Further at 904 a submission of commitments for P-1 similar lists (one for each of the other of the players 104a-104n) of H unique random natural numbers less than or equal to D is done. At 906 all the commitments from all the players 104a-104n are received by game-based server system 102. At 908 an enquiry into the receipt of commitments from all the players 104a-104n is done and if no, then there is a wait at 910 and if yes, then all the commitments are broadcast to all the players 104a-104n at 912. There is a wait by all the players 104a-104n till the determination of player deck PD (as in instance 1) at 914. Further at 916, every player 104a-104n determines their hole cards as the cards in the respective positions in their respective PD as specified by the H unique numbers previously committed and separates them leaving their player deck with D-H cards. Further at 918, every player 104a-104n communicates the positions of the hole cards which need to be replaced to game based server system 102. This may be a done by creating an array of H elements wherein each element being 0 or 1 depending on whether that hole card needs to be replaced or not. The game-based server system 102 waits for all players 104a-104n to send their replacement card info and signs it and broadcasts it to all players 104a-104n at 920. Further, commitments made for the respective P-1 lists to game-based server system 102 are revealed at 922 by each of the players 104a-104n. There is a wait for all players 104a-104n to reveal their P-1 lists previously committed, after which the game-based server system 102 broadcasts this info to all players 104a-104n at 924. Further a determination and enlistment of the lists created for self by other players 104a-104n, as T, is done by all the players 104a-104n at 926. At 928, all the first elements in lists in T are summed along with the first element in L to obtain S, and the first replacement card is determined as the [S % (D-H)]+1th card in the player deck leaving the deck with D-H-1 cards, and further replacement cards may be determined similarly if there is a need. For example, the corresponding to the second replacement card, S would be computed using the second elements of lists in T and the second element in L, and the position of this replacement card would be the [S % (D-H-1)]+1th card in the player deck, because only (D-H-1) cards are remaining.

There is a wait till showdown by game-based server system 102 and then it requests all players 104a-104n who have not folded to reveal their hole card commitments at 930. There is a further wait till showdown by players 104a-104n and if not folded, they reveal the commitment for hole cards at 932. The validity of the revelation is checked at 934. Further the receipt of revelations from all non-folded players 104a-104n is enquired at 936 if not then there is a wait at 938 and if yes, then computation of final hole cards after replacement for each of the players 104a-104n who have not folded takes place at 940. Further at 942, a broadcast of computed hole cards and revelations done by all the players 104a-104n is done by the game-based server system 102. All the revelations are verified at 944 by all the players 104a-104n, and finally hole cards are computed for the players 104a-104n who have not folded and verification against the hole cards computed by game-based server system 102 is done at 946.

Some token-based games require players to privately pickup tokens from a collection of tokens during the game after the distribution of private tokens. For example, in Rummy, players may pick cards from the deck after the distribution of hole cards, and in Dominoes, players pick up a domino from the boneyard (collection of dominoes). As also mentioned before, it is to be understood that a sub-protocol for privately picking up tokens from player deck or its equivalent for an online token-based game can be created in a manner similar to the above sub-protocol. One way could be a player needing to pick up a private token committing to a value and then asking for random inputs (under commitment) from rest of the players, and upon revelation combining the inputs and committed value to determine the token position in the player deck or its equivalent in the game. It can be seen that drawing of face-up tokens as in stud poker can similarly be done by immediately revealing the committed value.

Card games like Texas Hold'em Poker or Omaha Poker require provisions for drawing community (public) cards. These cards are drawn face up and sometimes in consecutive rounds. For example, in Texas Hold'em and Omaha Poker, there are three rounds of opening community cards called flop, turn and river, in which 3, 1 and 1 are cards opened respectively. In the present embodiment, these cards are drawn from the aforementioned community deck created by the server as a replica of the master deck computed during the deck shuffling sub-protocol (as in instance 1). The sub-protocol for doing a community card opening round involving opening of C cards in a verifiable and provably fair manner is described next.

Instance 4 (Considering an instance of sub-protocol for drawing C community cards in a game with P players using a community deck CD with M cards remaining in a verifiable and provably fair manner): The purpose of this sub-protocol is to draw community cards from CD in a manner in which outcomes cannot be predicted or predetermined by any colluding party. The including steps are: Each player 104a-104n creates a list of C random natural numbers each less than or equal to M. Each player 104a-104n sends a signed commitment of those C random natural numbers to the game-based server system 102. When the game-based server system 102 has received signed commitments from all the players 104a-104n, server broadcasts them to all the players 104a-104n. All the players 104a-104n reveal their list of C natural numbers to game-based server system 102, which broadcasts this information to all the players. For determination of the first community card, S is computed as the sum of all the values at the first position in the lists, and the community card is determined as the card at (S % M)+1th position in CD. The newly determined community card is removed from the CD, leaving it with M−1 cards. All community cards to be opened in the current round are determined one by one in a similar manner. The game-based server system 102 broadcasts the computed community cards and revelations done by all the players 104a-104n to all the client terminals 104a-104n. All the players 104a-104n similarly independently compute and verify the community cards computed by game-based server system 102 using the revelations.

FIG. 10 is a flow diagram 1000: depicting sub-protocol for drawing C community (public) cards from a community deck CD, having M cards remaining, in a community card opening round, according to an exemplary embodiment of the present disclosure. The method starts with each of the players 104a-104n independently creating a list K of C unique natural numbers each less than or equal to M at 1002. Further a cryptographic commitment is created for K and sent to game-based server system 102 at 1004. Commitments are received for drawing community cards at 1006. Reception of commitment from all the players 104a-104n is enquired at 1008. If no, then there is a wait at 1010, else if yes, then all the commitments are broadcast to all the players 104a-104n at 1012. All the players 104a-104n are requested to reveal commitment at 1014. The commitments are revealed at 1016. The validity of the revelations is checked at 1018 by game-based server system 102 followed by an enquiry about the receipt of revelations from all the players 104a-104n at 1020. If no, then there is a wait at 1036 else then S is computed as the sum of all the values at the first position in the lists at 1022. Determination of first community card as the card at (S % M)−1−1th position in CD takes place at 1024. The removal of the above card from CD, leaving it with M−1 cards, takes place at 1026. A determination of other community cards for the round similarly takes place at 1028 by using values at the second, third etc. places in the lists. For example, for determining the second community card for the round, S is computed using the second values in the lists, and the card is determined as the one at the [S % (M−1)]+1th position in the CD. Further, broadcasting of computed community cards and the revelations done by all the players 104a-104n is done by game-based server system 102 at 1030. All the revelations are verified by players 104a-104n at 1032, and finally the community cards are independently computed and verified against the ones computed by the game-based server system 102 at 1034.

It is to be noted that a colluding party, if it includes the game-based server system 102, can know the outcome of a critical step like opening of a community card as soon as all the players, other than the players in collusion, reveal their commitments pertinent to that critical step. So, if this result is not favorable for the collusion then a player in the collusion may decide to not reveal his commitment and disrupt the game and force the game-based server system 102 and rest of the players to redo the critical step from scratch. It is possible to discourage and possibly prevent this from happening by imposing a penalty on any player who disrupts the game at such exploitable stages of the game and make the above exploit cause loss for the collusion on the whole and at the same time safeguard the interests of all the honest players. One way to do this would be to make the penalty for a player disconnecting (dropping out) during a commitment revealing stage to be the server forfeiting a portion of the defaulting player's collateral to reimburse the rest of the players on the table in order to protect the interests of other players, each of which may suspect the defaulting player to be in a collusion with the game based server system 102 and all the players except himself, and that the defaulter disconnected (dropped out) to prevent the revelation of a certain outcome which was not favorable for the collusion.

The principle of distributing collaterals can also be used for ensuring timely and consistent behavior by all the participating players. For example, a portion of the collateral of a player may even be distributed when he disrupts the game by repeatedly doing an incorrect revelation of commitment. This process enables the game to be carried out without delays and protects the interest of the existing players who are continuing with the game.

Instance 5 (Considering an instance of sub-protocol for verifiable and provably fair betting round): Several card games like Poker and the like have alternating rounds of betting usually after the determination of community or hole cards. For example, Hold'em Poker has 4 rounds of betting and 5 cards, while Draw Poker has 2 rounds of betting. Typical actions during a betting round are bet, raise, call, check, fold and likewise. The purpose of this sub-protocol is to conduct a round of betting in a verifiable and provably fair manner. The including steps are: The game-based server system 102 asks the first player 104a-104n to act to submit his action. The player 104a-104n who needs to act, commits to their action (Bet, Call, Raise, Check, Fold etc.) by deciding upon a valid action given the rules and current context of the game. The player's respective client terminal 104a-104n submits the action to the game-based server system 102. The game-based server system 102 validates the received action and checks its validity in the current context of the game. If message is not found to be valid then it asks the player to resend a valid action along with the reason why the originally submitted action could not be accepted, otherwise the game-based server system 102 broadcasts the action to all the players 104a-104n. The game-based server system 102 asks the next active player 104a-104n (someone who has neither folded nor gone "all in" yet) to submit their action. The next active player 104a-104n on the table now acts in a similar manner, and this continues till the betting round is over according to the rules of the game.

FIG. 11 is a flow diagram 1100; depicting a sub-protocol to carry out a round of betting in a verifiable and provably fair manner, according to an exemplary embodiment of the present disclosure. The player 104a-104n to act first in the betting round is asked by the game-based server system 102 to submit an action at 1102. The first player 104a-104n who needs to act commits to their action (Bet, Call, Raise, Check, Fold etc.) by deciding upon a valid action given the rules and current context of the game and sends the action to the game-based server system 102. An action (Bet, Call, Raise, Check, Fold etc.) is decided as A by the player 104a-104n to act first in the betting round at 1104. Further, A is sent to game-based server system 102 at 1106 and received by game-based server system 102 at 1108, which enquires the validity of A in the context of the game at 1110. In case of invalidity, at 1112, the player 104a-104n is asked to resend the message. In case of validity, A is broadcast to all the players 104a-104n at 1114. Further, at 1116, game-based server system 102 decides whether the betting round is complete according to the rules of the game. If yes, then the process stops at 1118, else the next player 104a-104n is asked for an action at 1120 and the process resumes at 1104.

Details for creating protocols for carrying out two popular card games, Texas Hold'em Poker and 5-Card Draw Poker, in a verifiable and provably fair manner using the sub-protocols defined above are presented next.

FIG. 12 is a flow diagram 1200: depicting a method and protocol for carrying out a game of Texas Hold'em Poker using a standard deck of 52 cards in a verifiable and provably fair manner, according to an exemplary embodiment of the present disclosure. A game of Texas Hold'em Poker uses a standard deck of 52 cards and involves players 104a-104n being dealt 2-hole cards, and a total of 5 community cards, opened as flop, turn and river, in which 3, 1 and 1 cards are opened face up respectively. A player can make a best hand using any five cards from his 2-hole cards and the 5 community cards. A round of betting happens after the distribution of hole cards, and after each of the 3 community card revelation rounds. This leads to showdown, where the players 104a-104n who have not folded reveal their hole cards and the winners of the betting pots are decided.

To conduct this game in a verifiable and provably fair manner, the game-based server system 102 may setup the game, accept player 104a-104n connections and initialize the game at 1202, and further setting up the game initialization contract (GIC) at 1204, in a manner described earlier. Submission of cryptographic commitments to be used in the game is done by players 104a-104n at 1206. Each of the players 104a-104n independently creates separate cryptographic commitments for:
  a. A permutation of first 52 natural numbers to shuffle the deck of cards (as in Instance 1).
  b. A list of two unique natural numbers less than or equal to 52 for drawing 2-hole cards without replacement (as in Instance 2).
  c. A list of 3 random natural numbers less than or equal to 52 for drawing 3 community cards as flop (as in Instance 4).
  d. One random natural number less than or equal to 49 (only 49 cards remain in community deck after drawing flop) for drawing 1 community card as turn (as in Instance 4).
  e. One random natural number less than or equal to 48 (only 48 cards remain in community deck after drawing flop) for drawing 1 community card as river (as in Instance 4).

Upon receiving commitments from all the players 104a-104n, the game-based server system 102 signs and broadcasts these commitments to all the players 104a-104n at 1208. Players 104a-104n reveal their commitments for the shuffle permutation to the game based server system 102 and deck shuffling sub-protocol (as in Instance 1) is carried out using commitments from all the players 104a-104n at 1210 to produce master deck MD. MD is replicated by the game based server system 102 as the community deck at 1212, and by all the players 104a-104n individually as player decks to determine their hole cards (as in Instance 2) at 1214.

One round of betting using betting round sub-protocol (as in Instance 5) takes place at 1216. Further, revealing of 3 flop cards using the community card revealing sub-protocol (as in Instance 4) takes place at 1218, followed by one round of betting using the betting round sub-protocol (as in Instance 5) takes place at 1220. Further, revealing of 1 turn card using the community card revealing sub-protocol (as in Instance 4) takes 1222, followed by one round of betting using the betting round sub-protocol (as in Instance 5) at 1224. Further, revealing of 1 river card using the community card revealing sub-protocol (as in Instance 4) takes place at 1226, followed by one round of betting using the betting round sub-protocol (as in Instance 5) at 1228. At 1230, hole cards for players 104a-104n who have not folded are determined (as in Instance 2) during showdown. In a game of Texas Hold'em Poker, split pots may be created when one player 104a-104n is short stacked and unable to call a bet completely, the winner of a pot is decided as the player 104a-104n having the best hand amongst the players 104a-104n claiming the pot. The game-based server system 102 and the players 104a-104n compute and verify the winners of each of the pots created during the game according to game rules finally at 1232.

It is interesting to note that the use of multiple replicated decks (individual player decks and community deck) can lead to repetition of the same denomination of a token value. For example, a player can get a "King of Hearts" in his hole cards which are drawn from his player deck and in the flop which is drawn from community deck. As mentioned before, the rules for determining the best hand are defined by the central game server while setting up the game. One simple way for doing this could be to allow any token denomination to appear only once while creating the best hand. It should be noted that rules of other token-based games may similarly be easily modified, if required, and specified during the start of the game in GSI to handle the scenarios of repeating denominations.

FIG. 13 is a flow diagram 1300 depicting a method and protocol for carrying out a game of 5 Card Draw Poker, having P players and using a standard deck of 52 cards, in a verifiable and provably fair manner, according to an exemplary embodiment of the present disclosure. A game of 5 Card Draw Poker, using a standard deck of 52 cards, involves players 104a-104n being dealt 5-hole cards, which players 104a-104n can choose to keep or replace, and no community cards are drawn. A player 104a-104n with a better final set of hole cards according to the rules of the game is considered winner at showdown. A round of betting happens after the distribution of hole cards, and another after the players 104a-104n have replaced their unwanted hole cards. This is followed by the showdown, where the players 104a-104n who have not folded reveal their hole cards and the winners of the pots are decided.

To conduct this game in a verifiable and provably fair manner, the game-based server system 102 may setup the game, accept player 104a-104n connections and initialize the game at 1302, and further setting up the game initialization contract (GIC) at 1304, in a manner described earlier. Submission of cryptographic commitments to be used in the game is done at 1306. Each of the players 104a-104n creates commitments for:
  a. A permutation of first 52 natural numbers to shuffle the deck of cards (as in Instance 1).
  b. A list of 5 unique natural numbers less than or equal to 52 for drawing 5-hole cards with replacement (as in Instance 3).

c. P-1 lists of 5 natural numbers less than or equal to 52 for each of the other players for determining the replacement cards (as in Instance 3).

Upon receiving commitments from all the players 104a-104n, the game-based server system 102 signs and broadcasts these commitments to all the players 104a-104n at 1308. Players 104a-104n reveal their commitments for the permutation to the game-based server system 102 and deck shuffling sub-protocol (as in Instance 1) is carried out using commitments from all the players 104a-104n at 1310. The resulting master deck MD is replicated by all the players 104a-104n individually as player decks to determine their hole cards (as in Instance 3) at 1312. One round of betting is carried out (as in Instance 5) at 1314. Further unwanted hole cards are replaced by all the players 104a-104n using sub-protocols for selecting hole cards with replacement (as in Instance 3) at 1316. Further another round of betting (as in Instance 5) is carried out at 1318. At 1320, hole cards for players 104a-104n who have not folded are determined (as in Instance 3) during showdown. Finally, the game-based server system 102 and the players 104a-104n compute the winners of each of the pots created during the game according to game rules at 1322.

It is to be noted that it is possible to build verifiable and provably fair protocols for various other variants of Poker games, a variety of other card games, table games and even new games.

As noted earlier, collusion is another problem faced by online players. Usual methods of preventing and detecting collusion may involve studying the IP of the players and studying the playing behaviors of a player or a group of players. In this regard, a method to prevent and minimize the likelihood of collusion by doing a random placement of players across game tables with identical game settings is described next. It is to be understood that this process takes place before starting the game.

Referring FIG. 14 is a flow diagram 1400; depicting a method and protocol for random assignment of P players to P seats on a set of tables with identical game settings to prevent and minimize chance of collusion, in a verifiable and provably fair manner, according to an exemplary embodiment of the present disclosure. The purpose of this protocol is to assign seats to a pool of players to seats of a set of multiple tables having same game settings like game rules, buy in, etc., in an unpredictable and non-predeterminable manner so that the likelihood of players in a collusion getting assigned the same table is low. The process starts with game-based server system 102 setting up an invitation for players 104a-104n to get a seat on the set of multiple tables at 1402. Players 104a-104n enlist themselves for playing at one of these tables by making a request to game-based server system 102 at 1404 and creating a fresh key pair and sending their public key to game-based server system 102 at 1406. All messages sent by players 104a-104n to game-based server system 102 now are signed. When the game-based server system 102 gets enough players 104a-104n (equal to number of seats on the tables hosted) enlisting to play the game, then game-based server system 102 compiles an ordered list L of all the players 104a-104n enlisted and their respective public keys at 1408 and broadcasts this information to all the players 104a-104n at 1410. The players 104a-104n then proceed by creating a permutation of first P natural numbers at 1412 and sending a commitment for the same to game-based server system 102 at 1414. When commitments from all the players 104a-104n have been received, game-based server system 102 broadcasts these commitments to all the players 104a-104n at 1416. All the players 104a-104n then reveal their commitments to the game-based server system 102 at 1418. The game-based server system 102 then checks the validity of all the revelations at 1420. Further, the game-based server system 102 creates a list Q of the first P natural numbers, and then applies all the permutations revealed from all the players 104a-104n, according to their ordering in L, to Q to obtain a new list W at 1422. The game-based server system 102 then broadcasts all the revelations done by the players 104a-104n along with W at 1424. Players 104a-104n check the validity of these revelations at 1426. Further at 1428, the game-based server system 102 then assigns players 104a-104n to the seats of the tables according to W and L, that is, considering V is the first element in W, then first seat in the first table is assigned to the player 104a-104n who is listed at the Vth position in L, and so on. Then, at 1430, the game-based server system 102 informs the players 104a-104n their respective allocated seat and table. Players 104a-104n verify their assigned seat using W and L at 1432. The game-based server system 102 may then host the aforementioned tables and accept player 104a-104n connections and seat them on their assigned seats and proceed with setting up the game as described earlier. The players 104a-104n may additionally be required to use the same public key for playing the game, as this would help players 104a-104n in verifying the validity of the players 104a-104n occupying the other seats on their table looking at the game initialization information.

Although the present disclosure has been described in terms of certain preferred embodiments and illustrations thereof, other embodiments and modifications to preferred embodiments is possible that are within the principles and spirit of embodiments of the invention. The above descriptions and figures are therefore to be regarded as illustrative and not restrictive.

Thus, the scope of the present disclosure is defined by the appended claims and includes both combinations and sub combinations of the various features described herein above as well as variations and modifications thereof, which would occur to persons skilled in the art upon reading the foregoing description.

The invention claimed is:

1. An online cryptographically-based system to implement and manage, in a provably fair manner, a token-based game employing a set of N tokens in an initial set configuration, the system comprising:
a central game server compiling game setup information (GSI) to set up the game; and
a protocol manager capable of carrying out one or more cryptographic primitives selected from the group consisting of a digital signature scheme using public key cryptography, a cryptographic hash, and a commitment scheme, the protocol manager assisting the central game server with initiation and verification of cryptographic communications with those primitives;
wherein:
the central game server broadcasts the GSI, to each of a plurality of P players, each at a respective one of a plurality of P client terminals, that will be involved in playing the game; and
responsive to a connection to the game from each of the plurality of P client terminals, the central game server implements a plurality of sub-protocols, including:
a. shuffling the set of N tokens, beginning with an initial set configuration, by receiving, under a first cryptographic commitment scheme, from each player, at a respective one of the plurality of P client terminals, an ordering of the set of N tokens and successively applying, according to a predetermined ordering of players, the orderings from at least two of the players to the initial set configuration, so as to produce a shuffled set of N tokens as a shuffled master set;

b. distribution of P new sets of tokens, as player sets, to the respective P client terminals, after production of the shuffled master set, each of the P new sets of tokens having the same configuration of tokens as shuffled master set so that each player is playing with the same shuffled master set; and c. assigning of H player tokens individually to each of the P players where H<N, by receiving prior to completion of sub-protocol a., under a second cryptographic commitment scheme, from each player, a selection of H tokens out of the N tokens in the respective player sets.

2. The system as claimed in claim 1, wherein:
the central game server extends the sub-protocol b, to provide, to the P client terminals, a copy of the shuffled master set as a community set of N tokens, for drawing of community tokens, and implements a further sub-protocol d. wherein: a predetermined number C of tokens from the community set, with M tokens remaining, are identified to all P players as community tokens, starting with receiving, under a third cryptographic commitment scheme, and subsequently combining, from each of the P players an identification of C tokens in the community set, with M tokens remaining, where C<M and M<N.

3. The system as claimed in claim 2, wherein, in sub-protocol a., the ordering of the set of N tokens comprises application of a random permutation of the first N natural numbers to the initial set configuration.

4. The system as claimed in claim 2, wherein, in sub-protocol c., the selection of H tokens out of the N tokens in the respective player sets comprises H unique natural numbers each less than or equal to N, each corresponding to a token in a respective position in the player set.

5. The system as claimed in claim 2, wherein, in sub-protocol d., the identification of the predetermined number of C tokens in the community set, with M tokens remaining, comprises a list of C random natural numbers each less than or equal to M, each corresponding to a token in a respective position in the community set.

6. The system as claimed in claim 5, wherein the tokens correspond to a standard deck of playing cards, and during protocol b., copies of the shuffled master set are created as a community card deck, to draw community cards, and P respective player decks for each of the P players.

7. The system as claimed in claim 6, wherein sub-protocol c. has a provision for replacement of player cards.

8. The system as claimed in claim 7, wherein the game is selected from the group consisting of Texas Hold'em, Draw Poker, Stud Poker, Omaha Poker and Razz Poker, wherein the cards drawn by two or more of the P players, and the cards drawn as community cards, may have the same card denomination from the standard deck of playing cards.

9. The system as claimed in claim 8, wherein the central game server collects collaterals to discourage players from dropping out of the game.

10. The system as claimed in claim 8, wherein, in sub-protocol d., the community cards are identified by:
i. receiving, under a cryptographic commitment scheme, from each player a set of C natural numbers, each number being less than equal to M, where each number corresponds to a position in the set of M remaining cards in the community card deck;
ii. for a first position in the set of C numbers, adding numbers at that first position as received respectively from at least two of the players to obtain a sum S;
iii. identifying a card in position (S modulo M)+1, in the community card deck, as a first one of the cards to be shown to the players; and
iv. repeating ii. and iii. for each other position in the set of C numbers, and accounting for revealing prior cards by reducing the argument of modulo by 1, until all C cards have been identified and shown to the players.

11. The system as claimed in claim 10, wherein the central game server further implements the following sub-protocol, after each iteration of sub-protocol c. or sub-protocol d.:
e. allowing each of the players to take an action to either continue to participate or to cease to participate in the game, by:
i. showing an identified card to the players;
ii. receiving, from each player, an action corresponding to either continued participation, or discontinued participation in the game.

12. The system as claimed in claim 11, wherein in sub-protocol e. ii, the action received is one of the groups consisting of bet, call, raise, check, and fold, or replacement of one or more player cards.

13. The system as claimed in claim 2, wherein the token-based game does not have a limit on how many players may participate.

14. The system as claimed in claim 2, wherein the central game server broadcasts to all of the P client terminals, any communication it receives from any of the players, to allow players to verify the fairness of the conduct of the game.

15. The system as claimed in claim 2, wherein the central game server is implemented as a smart contract.

16. The system as claimed in claim 15, wherein the central game server is implemented as a smart contract on a blockchain.

17. The system as claimed in claim 2, wherein the central game server further comprises a server blog, on which it posts all its communications, and also requires all players to post their communications on their respective player blogs, so as to facilitate higher communication reliability.

18. The system as claimed in claim 2, wherein the central game server hosts a plurality of game tables, and assigns players randomly to different game tables based on a cryptographic input shared, under a commitment scheme, so as to reduce a possibility of collusion.

19. The system as claimed in claim 2, wherein the system further comprises digital signature scheme for communication to facilitate verification of game events.

20. The system as claimed in claim 19, wherein the central game server requires appending of all messages with a cryptographic hash of all the communication during the game, to prevent replay attacks.

* * * * *